(12) United States Patent
Su et al.

(10) Patent No.: US 12,160,349 B2
(45) Date of Patent: Dec. 3, 2024

(54) SYSTEMS AND METHODS FOR INPUT SWITCHING OF ACCESSORY DEVICES

(71) Applicant: Microsoft Technology Licensing, LLC, Redmond, WA (US)

(72) Inventors: Stephanie Wen Su, Seattle, WA (US); Ryan Jeffrey Phillips, Portland, OR (US); Ryan Eugene Whitaker, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/113,896

(22) Filed: Feb. 24, 2023

(65) Prior Publication Data

US 2024/0291727 A1 Aug. 29, 2024

(51) Int. Cl.
| | |
|---|---|
| H04L 41/22 | (2022.01) |
| A63F 13/24 | (2014.01) |
| A63F 13/26 | (2014.01) |
| A63F 13/92 | (2014.01) |
| H04L 41/06 | (2022.01) |
| A63F 13/235 | (2014.01) |
| A63F 13/285 | (2014.01) |
| A63F 13/327 | (2014.01) |
| A63F 13/428 | (2014.01) |

(Continued)

(52) U.S. Cl.
CPC .............. *H04L 41/22* (2013.01); *A63F 13/24* (2014.09); *A63F 13/26* (2014.09); *A63F 13/92* (2014.09); *H04L 41/06* (2013.01); *A63F 13/235* (2014.09); *A63F 13/285* (2014.09); *A63F 13/327* (2014.09); *A63F 13/428* (2014.09); *A63F 13/98* (2014.09); *H04L 67/02* (2013.01); *H04L 67/131* (2022.05); *H04W 4/80* (2018.02); *H04W 12/50* (2021.01)

(58) Field of Classification Search
None
See application file for complete search history.

(56) References Cited

U.S. PATENT DOCUMENTS 8,369,795 B2 * 2/2013 Glaser ..................... A63F 13/22
455/73
8,641,525 B2 * 2/2014 Burgess .................. A63F 13/24
200/341

(Continued)

OTHER PUBLICATIONS

"DS4Windows Mode User Guide", Retrieved From: https://vigem.org/projects/DsHidMini/DS4-Mode-User-Guide/#light-bar-color-to-leds-translation, Retrieved From: Nov. 14, 2022, 13 Pages.

(Continued)

*Primary Examiner* — Lashonda Jacobs-Burton
(74) *Attorney, Agent, or Firm* — RAY QUINNEY & NEBEKER P.C.; John O. Carpenter

(57) ABSTRACT

A device includes a controller body, at least one user input device supported by the controller body, a communication device, and a status indicator. The communication device communicates at least one property of the at least one user input device to a selected endpoint connection. The status indicator is located proximate a surface of the body, and the status indicator dynamically indicates the selected endpoint connection of the communication device, where the selected endpoint connection is selected from a plurality of endpoint connections including at least a local electronic device and an access point configured to communicate with a cloud service.

20 Claims, 10 Drawing Sheets

(51) Int. Cl.
*A63F 13/98* (2014.01)
*H04L 67/02* (2022.01)
*H04L 67/131* (2022.01)
*H04W 4/80* (2018.01)
*H04W 12/50* (2021.01)

(56) References Cited

U.S. PATENT DOCUMENTS

| | | | |
|---|---|---|---|
| 8,827,806 B2 | 9/2014 | Mccauley et al. | |
| 9,289,678 B2 * | 3/2016 | Lum | A63F 13/26 |
| 10,630,773 B2 * | 4/2020 | Holmes | G10L 15/22 |
| 10,806,997 B2 | 10/2020 | Winick | |
| 10,833,338 B2 * | 11/2020 | Goto | H01M 8/0273 |
| 10,835,811 B2 * | 11/2020 | Tsuchiya | A63F 13/24 |
| 10,864,436 B2 * | 12/2020 | Okamura | A63F 13/24 |
| 10,926,169 B2 * | 2/2021 | Itay | A63F 13/20 |
| 11,027,199 B2 * | 6/2021 | Holmes | A63F 13/355 |
| 11,161,038 B2 * | 11/2021 | Penello | A63F 13/25 |
| 11,241,631 B1 | 2/2022 | Buller | |
| 11,260,288 B2 | 3/2022 | Seibert et al. | |
| 11,338,197 B2 | 5/2022 | Pelissier et al. | |
| 2004/0224768 A1 * | 11/2004 | Hussaini | A63F 13/24 463/37 |
| 2007/0105623 A1 * | 5/2007 | Tanaka | H04W 48/08 713/168 |
| 2009/0131171 A1 | 5/2009 | Miyazaki | |
| 2011/0105231 A1 * | 5/2011 | Ambinder | A63F 13/24 463/38 |
| 2012/0003935 A1 * | 1/2012 | Lydon | H04M 1/72409 455/74.1 |
| 2014/0027421 A1 | 1/2014 | Notheis | |
| 2014/0221087 A1 * | 8/2014 | Huang | A63F 13/335 463/31 |
| 2014/0365694 A1 * | 12/2014 | Bolton | H04W 80/02 710/106 |
| 2017/0142201 A1 * | 5/2017 | Holmes | A63F 13/355 |
| 2018/0333641 A1 * | 11/2018 | Strahle | A63F 13/24 |
| 2019/0373303 A1 * | 12/2019 | Ashraf | G06F 3/167 |
| 2020/0179803 A1 * | 6/2020 | Holmes | A63F 13/285 |
| 2020/0306625 A1 * | 10/2020 | Palmer | G06F 3/038 |
| 2021/0236917 A1 * | 8/2021 | Palmer | H04W 76/11 |
| 2022/0379199 A1 * | 12/2022 | Lea | A63F 13/77 |
| 2023/0090035 A1 * | 3/2023 | Lea | H04W 48/18 370/329 |
| 2023/0091057 A1 * | 3/2023 | Lea | H04L 5/0053 370/329 |

OTHER PUBLICATIONS

"Stratus Duo", Retrieved From: https://downloads.steelseriescdn.com/guides/StratusDuo_PIG_22.pdf, Retrieved From: Nov. 14, 2022, 48 Pages.

"Xbox Wireless Adapter for Windows 10", Retrieved From: https://www.xbox.com/en-US/accessories/adapters/wireless-adapter-windows, Jan. 31, 2018, 3 Pages.

Anwar, Kamil, "PS5 DualSense Controller Lights Guide", Retrieved From: https://appuals.com/ps5-dualsense-controller-lights-guide/, Jan. 26, 2022, 9 Pages.

Jansen, et al., "The best game controllers for Android phones and tablets in 2022", Retrieved From: https://www.digitaltrends.com/mobile/best-android-game-controllers/, Jul. 6, 2022, 49 Pages.

International Search Report and Written Opinion received for PCT Application No. PCT/US24/015893 May 31, 2024, 12 pages.

* cited by examiner

SYSTEMS AND METHODS FOR INPUT SWITCHING OF ACCESSORY DEVICES

BACKGROUND

Background and Relevant Art

Accessory devices communicate with a host device to send and receive information from a host application. Accessory devices can be used with a plurality of host devices, and users may move the accessory device between locations to use while away from the home or office. Conventionally, accessory devices are paired and re-paired with new host devices each time they are used with a different host device. Some devices are able to advertise availability and pair with known devices, but only with a currently active radio of the accessory device. Changing between communication protocols and active radios of the accessory device requires a secondary control device, such as a smartphone or other electronic device, to control the accessory device.

BRIEF SUMMARY

In some embodiments, a device includes a controller body, at least one user input device supported by the controller body, a communication device, and a status indicator. The communication device communicates at least one property of the at least one user input device to a selected endpoint connection. The status indicator is located proximate a surface of the body, and the status indicator dynamically indicates the selected endpoint connection of the communication device, where the selected endpoint connection is selected from a plurality of endpoint connections including at least a local electronic device and an access point configured to communicate with a cloud service.

In some embodiments, a method of presenting device information to a user includes receiving a data channel personality change request from a personality button of a game controller; requesting a data channel connection between a communication device of the game controller and a selected endpoint connection from a plurality of endpoint connections, wherein the plurality of endpoint connections have at least three different communication protocols, establishing a data channel between the communication device of the game controller and the selected endpoint connection; and in response to establishing the data channel, indicating the selected endpoint connection via a symbol representative of the selected endpoint connection on a status indicator of the game controller.

In some embodiments, a method of presenting device information to a user includes receiving motion information from a motion sensor of an accessory device; based at least partially on the motion information, enabling a personality button of the accessory device; receiving a data channel personality change request from the personality button of the accessory device; requesting a data channel connection between a communication device of the accessory device and a selected endpoint connection from a plurality of endpoint connections, wherein the plurality of endpoint connections have at least three different communication protocols; establishing a data channel between the communication device of the accessory device and the selected endpoint connection; and in response to establishing the data channel, indicating the selected endpoint connection via a symbol representative of the selected endpoint connection on a status indicator of the accessory device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 1-2 is a system view diagram of the accessory device of FIG. 1-1 communicating with a host device;

FIG. 2 is a system diagram of components of an accessory device, according to at least some embodiments of the present disclosure;

FIG. 11-1 through FIG. 11-3 illustrate a status bar while an accessory device is changing endpoint connection, according to at least some embodiments of the present disclosure;

FIGS. 14-1 and 14-2 illustrate an accessory device with a selectively enabled status bar based on motion information, according to at least some embodiments of the present disclosure.

DETAILED DESCRIPTION

Figure 1:
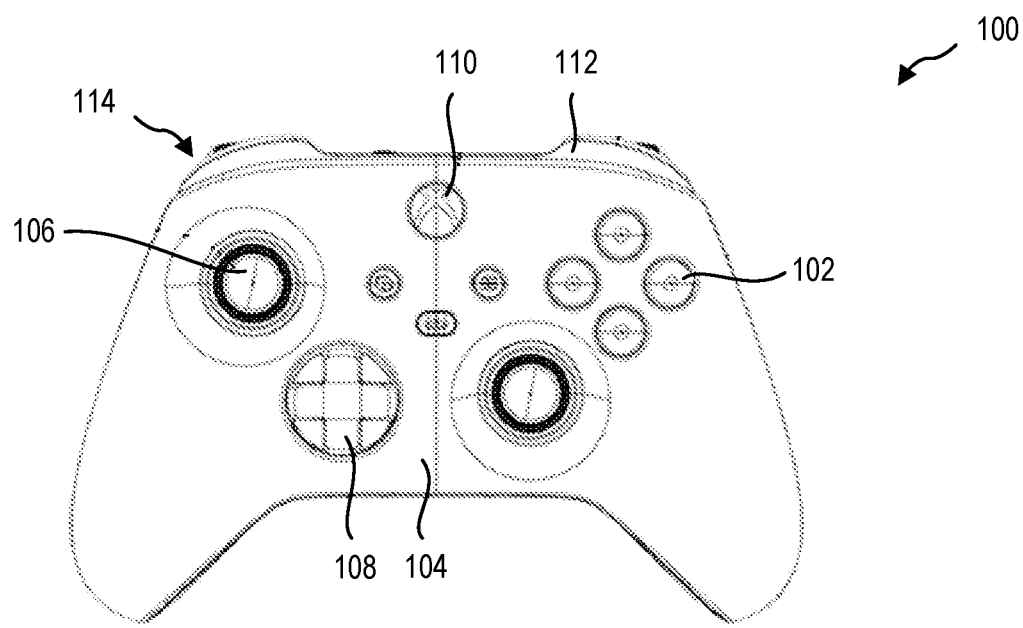
FIG. 1-1 is a front view of an accessory device.

The present disclosure relates generally to allowing a user to change an endpoint connection with a host device via an accessory device. More particularly, the present disclosure relates generally to systems and methods for allowing a user to intuitively and clearly select and change an endpoint connection between a plurality of host devices via an accessory device. In some embodiments, an accessory device includes a status indicator that clearly and intuitively indicates a currently selected and/or connected endpoint connection with a host device. In some embodiments, the accessory device includes a status bar with a plurality of icons located on the status bar that correspond to a plurality of communication protocols. For example, a status bar may include a first icon associated with a game console communication protocol (e.g., 802.11n or 802.11ax communication), a second icon associated with a different RF communication protocol to a different host device (e.g., BLUETOOTH communication protocols), and a third icon associated with a Cloud-Direct communication protocol with a network access point. In some embodiments, the accessory device is configured to communicate via a data channel at least with a local electronic device (e.g., a BLUETOOTH device, a game console) and an access point configured to communicate with a cloud service.

In some embodiments, the status bar includes further indicators that communicate different endpoint connections of a communication protocol. For example, a status bar may include device indicators that indicate to a user a selected endpoint connection or selected host device within a selected communication protocol. In at least one example, the status bar indicates to a user a Cloud-Direct communication protocol with a Cloud-Direct icon, while further indicators indicate a selected stored credential or a selected cloud service with which the accessory device is in communication. In at least another example, the status bar indicates to a user a Cloud-Direct communication protocol with a Cloud-Direct icon, while further indicators indicate a selected stored credential or a selected cloud service with which the accessory device is in communication.

In some embodiments, the status indicator includes an audio indicator for endpoint connection. For example, the status indicator outputs an audio signal to an audio output device. The audio output device may then play an audible sound to the user to indicate that an endpoint connection has been selected, an endpoint connection has been established, an error has occurred in endpoint connection, or other status of the endpoint connection.

In some embodiments, the status indicator includes a haptic indicator for endpoint connection. For example, the status indicator includes a haptic indicator that uses a linear haptic device (such as a voice coil actuator (VCA)), an eccentric rotating mass (ERM), other haptic device, or combinations thereof. The status indicator outputs a haptic signal to the haptic device(s), which, in turn, produce a haptic output through the accessory device to the user to indicate that an endpoint connection has been selected, an endpoint connection has been established, an error has occurred in endpoint connection, or other status of the endpoint connection.

In some embodiments, an accessory device includes an input mechanism on the accessory device to select and/or change an endpoint connection with a host device. In some embodiments, the input mechanism is a dedicated button, such as a personality button, that increments through or selects from a plurality of data channel personalities, where each data channel personality is associated with a different endpoint connection. In some embodiments, the input mechanism is secondary function of another input device on the accessory, such as face buttons or menu buttons of a game controller pressed in combination, as will be described in more detail herein.

In some embodiments, the input mechanism is selectively active for selecting or changing endpoint connections, such as when the accessory is oriented or moved in a particular manner or only during certain time periods after or during usage. For example, a selectively active input mechanism may receive endpoint connection change requests only when the accessory device is held upside-down from a conventional usage orientation or during a 5-second time period after turning the device on to limit and/or prevent unintentionally changing endpoint connections during use. In other examples, the accessory device receives a signal from a host device that instructs the accessory device to enable or disable (activate or deactivate) the input mechanism while the accessory device is in use with the host device. In at least one example, a game console host device transmits instructions to a game controller accessory device to disable the input mechanism while a game application is active, and the accessory device is being used to play the game application to limit and/or prevent unintentionally changing endpoint connections during gameplay.

In some embodiments, the accessory device includes a motion sensor that measures or determines an orientation or movement of the accessory device and selectively enables or disables the input mechanism in response to the orientation or movement of the accessory device. For example, the input mechanism (e.g., personality button) and/or status indicator (e.g., status bar) may be positioned on a top edge or back surface of the accessory device when held in a conventional orientation during use. When the accessory device is rotated toward the user to orient the top edge or back surface upward and/or toward the user, the accessory device activates the personality button.

In some embodiments, the status indicator is selectively active to avoid distracting the user during use of the accessory device. For example, the status indicator may be active only when the input mechanism is active. In some embodiments with an illuminated status bar or other illuminated status indicator, the status indicator may be active when the status indicator is oriented toward the user. For example, the status bar is in a dimmed state or unilluminated when a game controller is held flat, such as when held during use, while the status bar is in a bright state or illuminated when the user rotates the top edge of the controller upward toward the user. In some embodiments with a haptic status indicator, the accessory device selectively produces haptic outputs to limit and/or prevent distracting or confusing the user during conventional use of the accessory device such as playing a game application with a game controller or listening to audio information with headphones.

In some embodiments, the status indicator provides different visual, audio, or haptic outputs for an active connection, a pending connection, a successful connection, a failed connection or other events to communicate such events or states to the user. For example, a status bar may include a different symbol associated with different communication protocols. The status bar may flash the symbol associated with a pending selected endpoint connection while establishing the endpoint connection with the host device. The status bar may illuminate the symbol associated with an active selected endpoint connection in solid or continuously illuminated state. The status bar may flash in a different color and/or dim the symbol associated with a failed selected endpoint connection upon failure of an attempted endpoint connection with the host device.

Referring now to FIG. 1-1, in some embodiments, an accessory device 100 includes a plurality of input buttons located on or in a body 104 of the accessory device 100 with at least one directional input device. The directional input devices may include one or more analog thumbsticks 106 and/or one or more directional control pads 108. The input buttons may include face buttons 102, one or more menu or system buttons 110, shoulder buttons 112, trigger buttons 114, rear paddles, etc.

The thumbsticks 106 and/or directional control pads 108 may be used to control the movement of an avatar or cursor in a two- or three-dimensional virtual environment. The input buttons may be used to provide action commands (e.g., jump, crouch, defend, attack) to an avatar and/or interact with the environment. For example, a face button 102 may be used to provide a jump command to an avatar in an adventure game application, while an analog trigger button 114 may allow a user to precisely modulate a brake input for a racing game application.

In other examples, accessory devices may include audio output devices such as speakers or connection devices (e.g., a 3.5 mm audio jack, wireless radio) to communicate with speakers, audio input devices such as microphones or connection devices (e.g., a 3.5 mm audio jack, wireless radio) to communicate with speakers, haptic devices (e.g., linear haptic devices or eccentric rotating mass haptic devices), or other input or output devices that communicate with a host device. Due to the variety of input abilities and feedback abilities of accessory devices, it may be desirable to use a single accessory device with a plurality of host devices.

Figures 1, 2:
Figure 2:
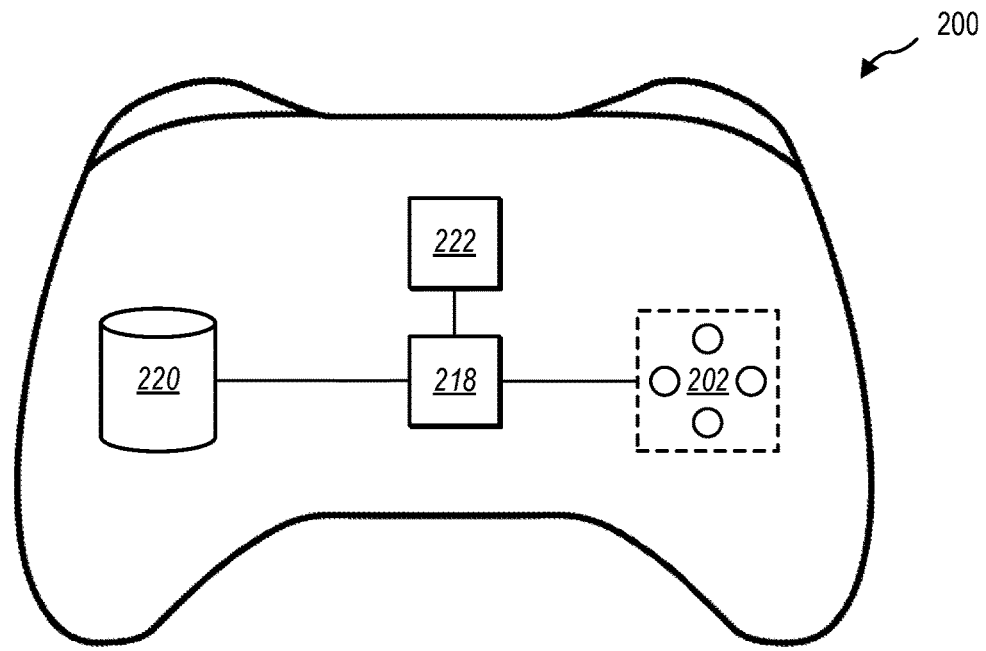

FIG. 1-2 illustrates an example of accessory devices 100-1, 100-2 communicating with a host device 116. The accessory device 100-1, 100-2 may be configured to wirelessly communicate with a plurality of host devices 116 using different communication methods and stored data channel personalities for those different communication methods. Conventional accessory devices, such as game controllers, speakers, headsets, keyboards, joysticks, and other human interface devices (HID) pair to a host device and remain paired to the host device until paired to a different host device. Even accessory devices that allow pairing to host devices over different frequencies or protocols conventionally remain paired with a single host device until paired with a different host device.

In some embodiments, an accessory device 200 according to the present disclosure, such as a game controller illustrated in FIG. 2 has, stored thereon, a plurality of data channel personalities that allow the accessory device to selectively change a data channel from a first host device using a first transceiver and/or first protocol to a second host device using a second transceiver and/or second protocol.

The accessory device 200 includes a processor 218 in communication with a hardware storage device 220. The hardware storage device 220 can be any non-transient computer readable medium that may store instructions thereon. The hardware storage device 220 may be any type of solid-state memory; volatile memory, such as static random access memory (SRAM) or dynamic random access memory (DRAM); non-volatile memory, such as read-only memory (ROM) including programmable ROM (PROM), erasable PROM (ERPOM) or EEPROM; magnetic storage media, such as magnetic tape; a platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory; or any other non-transient storage media. The hardware storage device 220 includes instruction stored thereon that, when executed by the processor 218, cause the accessory device 200 to perform any method or part of a method described herein. The hardware storage device 220 or another hardware storage device has, stored thereon, at least one data channel personality.

The accessory device 200 further includes a communication device 222, such as a radio frequency (RF) transceiver, that allows wireless transmission and receipt of data to the host device and/or control device. In some embodiments, the accessory device 200 has a plurality of communication devices 222 that provide communication at different frequencies or power levels to communicate with different host devices and/or control devices.

The data channel provides communication of state data, audio data, and other frequent communications between the accessory device 200 and a host device. In some embodiments, the accessory device 200 also communicates via a control channel with a control application that provides instructions to the accessory device to change data channel personality. In some embodiments, the control channel may broadcast other device information to the control application, such as current or available stored data channel personalities, current battery status of the accessory device 200, RSSI signal strength, or other functions. In some embodiments, the accessory device has at least one input mechanism locally on the accessory device to select, cycle through, or otherwise change the data channel personality. For example, the input mechanism may include face buttons 202, one or more menu or system buttons, shoulder buttons, trigger buttons, rear paddles, etc. such as described in relation to FIG. 1-1.

Some examples of data channel personalities stored on the accessory device 200 include, but at not limited to Bluetooth or Bluetooth low energy (BLE), Wi-Fi 802.11ac, Wi-Fi 802.11n, Wi-Fi 802.11ax, or other wireless data communication protocol. For each of the wireless data communication protocols, one or more stored pairing information and/or credentials are stored on the accessory device 200. The accessory device 200 may, therefore, "remember" previously paired devices, allowing the transceiver of the accessory device to establish a data channel with the associated host device when a data channel personality is selected.

Figure 3:
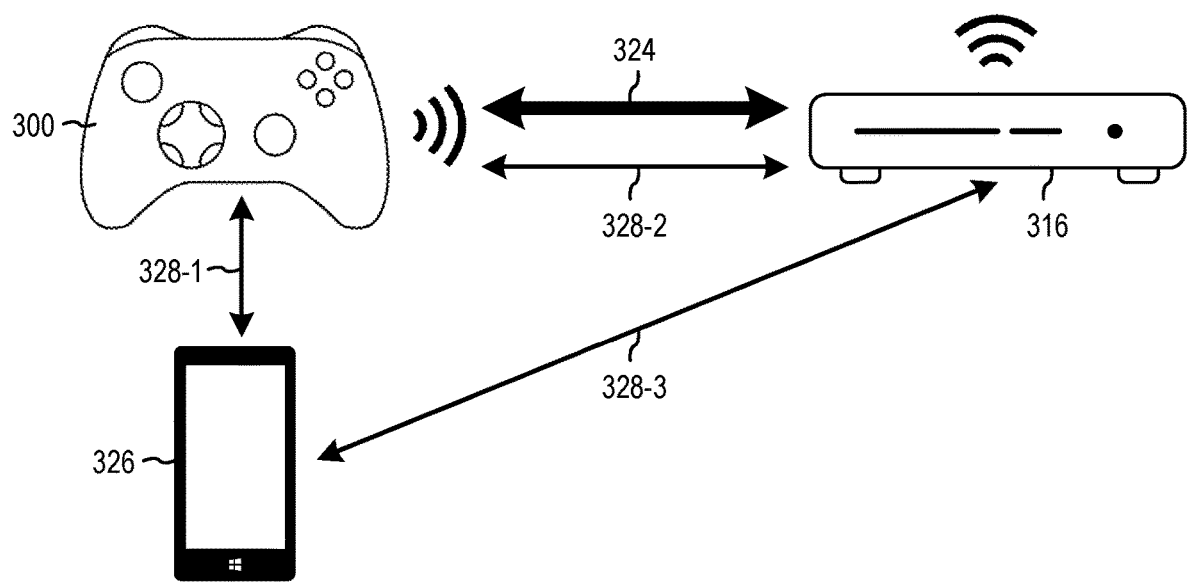
FIG. 3 is a system diagram of data channel and control channel connections with a local electronic device, according to at least some embodiments of the present disclosure.

Referring now to FIG. 3, in some embodiments, a system includes an accessory device 300 in communication with a host device 316 by a data channel 324 and with a control device 326 via a first control channel 328-1. Other control channels 328-2, 328-3 may further allow device information to be communicated or shared between devices of the system. For example, a second control channel 328-2 between the accessory device 300 and the host device 316 may allow communication of device health and device status information between the accessory device 300 and the host device 316. A third control channel 328-3 between the control device 326 and the host device 316 may allow communication of device health and device status information between the control device 326 and the host device 316.

A data channel 324 includes real-time or substantially real-time communication between the accessory device 300 and the host device 316 to allow a user to interact with a host application executed by the host device 316, such as a game application running on a game console (e.g., MICROSOFT XBOX, SONY PLAYSTATION, NINTENDO SWITCH). The host application may be natively executed on the host device 316. The host application may be a streamed game application executed on a cloud server and accessed through an access point (the host device) to which the accessory device has a data channel. For example, a game controller may transmit controller state data to the host device 316 via the data channel 324 to interact with a game application running on or accessed through the host device 316. In other examples, a headset may receive audio data from the host device 316 via the data channel 324 to represent the sounds in a game environment. In yet other examples, a game controller with a headset connected thereto may transmit chat audio data from the headset through the game controller to the host device 316 via the data channel 324. In some embodiments, the data channel 324 allows for transmission of data between the accessory device 300 and host device 316 at least every 2 milliseconds.

A control channel 328-1, 328-2, 328-3 may allow non-latency-critical information to be transmitted between the accessory device 300 and a control application or device 326. In some embodiments, the control device 326 is different from the host device 316. For example, a control device 326 may be a user's smartphone that communicates with the accessory device 300 via the control channel 328-1 while the accessory device 300 communicates with a host device 316, such as a game console, via the data channel 324. In some embodiments, the control device 326 is the host device 316, and a control application is different from the host application with which the accessory device 300 communicates via the data channel 324. For example, a game controller may communicate with a game application running on a PC via a data channel while communicating with the control application also running on the PC via a control channel that is independent of the data channel. In such an example, selecting a different data channel personality for the accessory device in the control application will instruct the accessory device to establish a new data channel with a different host device.

In a particular embodiment, the accessory device is a game controller with a plurality of data channel personalities stored thereon. The game controller is in data communication with a control application running on a smartphone via a control channel. The control channel may be established using BLE between the game controller and the smartphone to target low bandwidth and latency-tolerant communication. The control channel allows the control application to send instructions to the game controller to select the game console data channel personality from the hardware storage device of the game controller. The game controller can then, via a Wi-Fi protocol such as 802.11n or 802.11ax, establish a data channel with the game console (i.e., host device) for a low-latency data connection to interact with the game application (or operating system or other application) running on the game console. The control channel may persist while the game controller changes data channel personalities and data channels with a plurality of host devices.

The data channel personality is changed by loading and transitioning the radio firmware, vendor radio firmware, and control firmware resident on the accessory device to the new personality. The radio firmware, vendor radio firmware, and control firmware associated with each data channel personality are stored locally on non-volatile memory on the accessory device.

In some embodiments, the data channel personalities use Wi-Fi, Bluetooth, and other RF frequencies. The data channel personalities may include a direct connection to a game console using 802.11n, a direct connection to a game console using 802.11ax, a Bluetooth connection using an isochronous data stream to a game console, PC, smartphone, or other computing device; a TCP/IP connection through an access point to a cloud datacenter, or other wireless data communication protocols. Only a single data channel personality is active at any time for reliable communication with the host device. Conversely, a plurality of control channels may be active at any time to allow communication of status information and/or latency tolerant data with the control device, the host device, and other devices.

Figure 4:
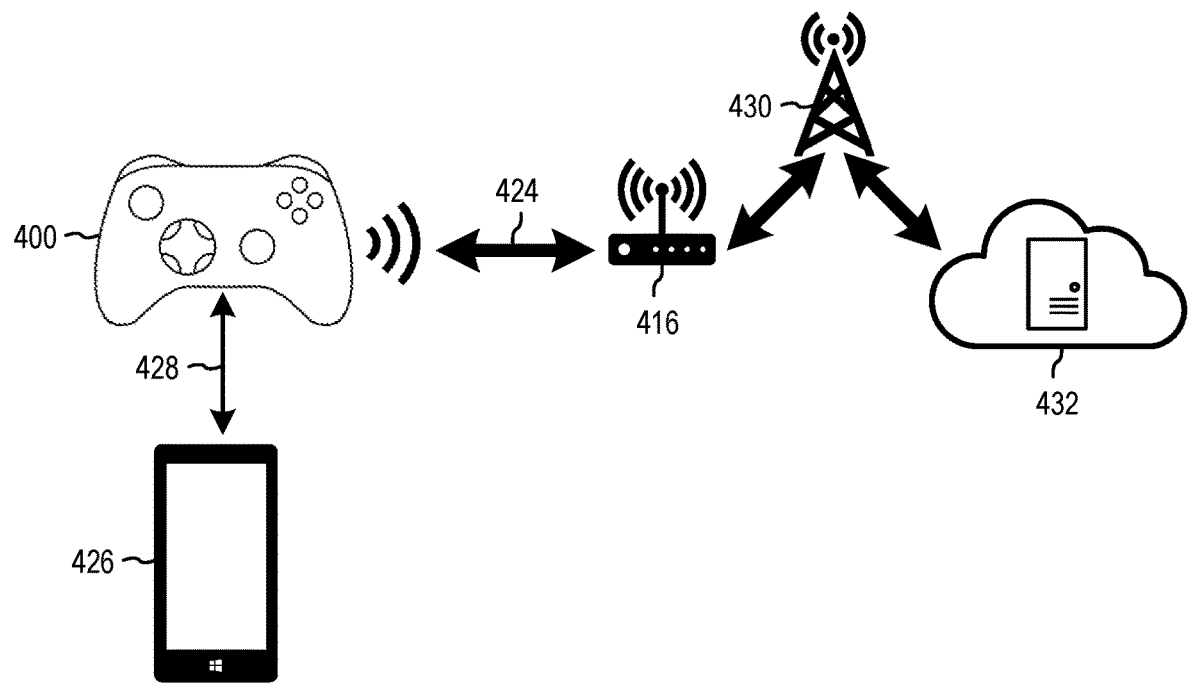
FIG. 4 is a system diagram of data channel and control channel connections with a cloud service, according to at least some embodiments of the present disclosure.

In some embodiments, the accessory device 400 can interact with cloud-based services through an access point with a Wi-Fi connection, such as illustrated in FIG. 4. The accessory device 400 receives access point credentials and cloud-based service login credentials through the control channel 428 to a control application or control device 426. In a specific example, a game controller may receive access point credentials to establish a data channel 424 with a host device 416, such as a wireless access point, to access a cloud-based service 432 via a network 430. The game controller may also receive login credentials to associate the game controller with the user's account on the cloud-based service 432. In other examples, the accessory device 400 includes a screen and/or keyboard to allow manual input of the credentials and other information without the use of a control channel 428.

In a specific example, a game controller may establish a connection to the user's XBOX CLOUD GAMING account directly through an access point, reducing latency compared to communicating through, first a PC or smartphone, second an access point, and third to the XBOX CLOUD GAMING account. Similarly, a headset or other accessory device may connect directly to the XBOX CLOUD GAMING account and be associated with the same session through a direct connection through the access point. A cloud-direct data channel personality may use TCP/IP (Level 1 through 7 of the OSI stack) to communicate state data or receive audio or haptic information.

When this personality is enabled, the accessory device 400 may initially gather access point and credential information securely from a control channel 428 or through manual input into the accessory device 400 directly. The accessory device 400 will then attempt to pair with the access point host device 416 and XBOX CLOUD GAMING to securely attest itself and begin communication. To assist the user, when the Cloud-Direct personality is loaded, previously-stored SSID and access point credentials will be accessed from non-volatile storage on the accessory device 400 and used. This allows the user to re-connect without needing the initial control device 426 setup or manual input.

In conventional embodiments, a user views which data channel 424 personality is active on the accessory device 400 via the control application or control device 426. For example, a smartphone connected to the accessory device 400 via a control channel 428 may display the control application, which indicates which data channel 424 personality is active on the accessory device 400. In some embodiments, as will be described in greater detail herein, a user views which data channel and/or endpoint connection is active on the accessory device 400 via status indicators of the accessory device 400.

Figure 5:
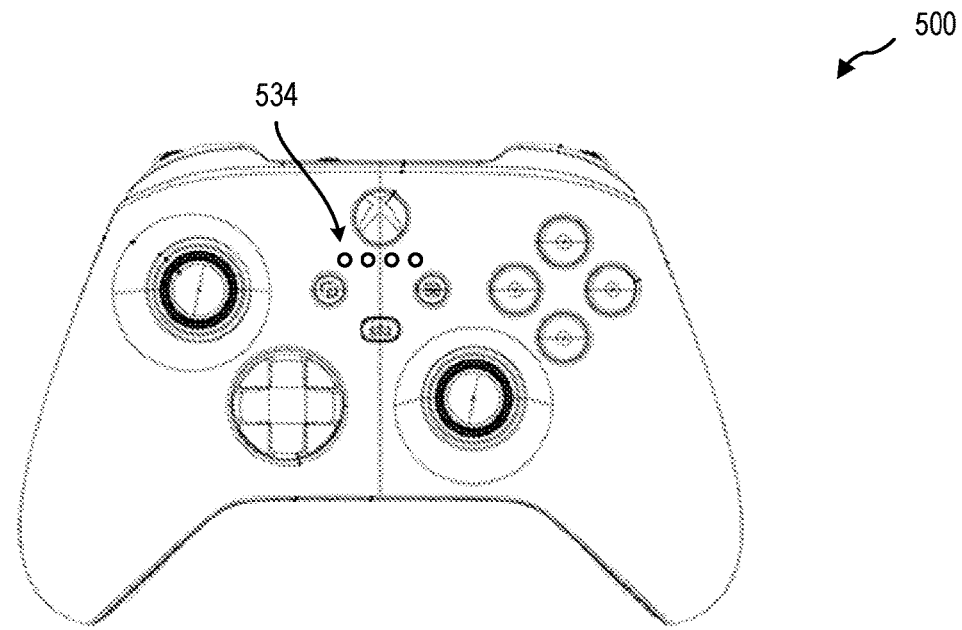
FIG. 5 is a front view of an accessory device with status indicators, according to at least some embodiments of the present disclosure.

Referring now to FIG. 5, in some embodiments, the accessory device 500 includes one or more status indicators to indicate to the user which data channel personality is active on the accessory device 500. In some embodiments, the status indicator is located proximate to a surface of the body of the accessory device 500 (such as the body 104 described in relation to FIG. 1) to allow a user to view the status of the data channel personality without a separate device or screen. In some examples, the status indicator is located on a surface of the body of the accessory device 500, such as affixed to the surface of the body. In some examples, the status indicator is located in a surface of the body of the accessory device 500, such as lights embedded in the surface of the body. It should be understood that the status indicator may be located proximate any surface of the body of the accessory device, including the front surface, top surface, back surface, etc.

For example, the accessory device 500 may include a plurality of status lights 534 on the accessory device 500 that are associated with different data channel personalities. The illuminated status light 534 may indicate the active data channel personality of the accessory device 500. In some embodiments, the status light 534 may illuminate with the associated data channel personality is selected and change color when a data channel is established with the host device. In at least one embodiment, the status light 534 may illuminate a first color, change to a second color upon establishing a data connection with an access point, and change a third color upon establishing a connection with a user's account on a cloud-based service through the access point. In at least another embodiment, the status light 534 may flash when a data channel personality is selected and turn solidly illuminated upon establishing a data connection with a host device. The status light 534 may then change color upon establishing a connection with a user's account on a cloud-based service through the access point.

Figure 6:
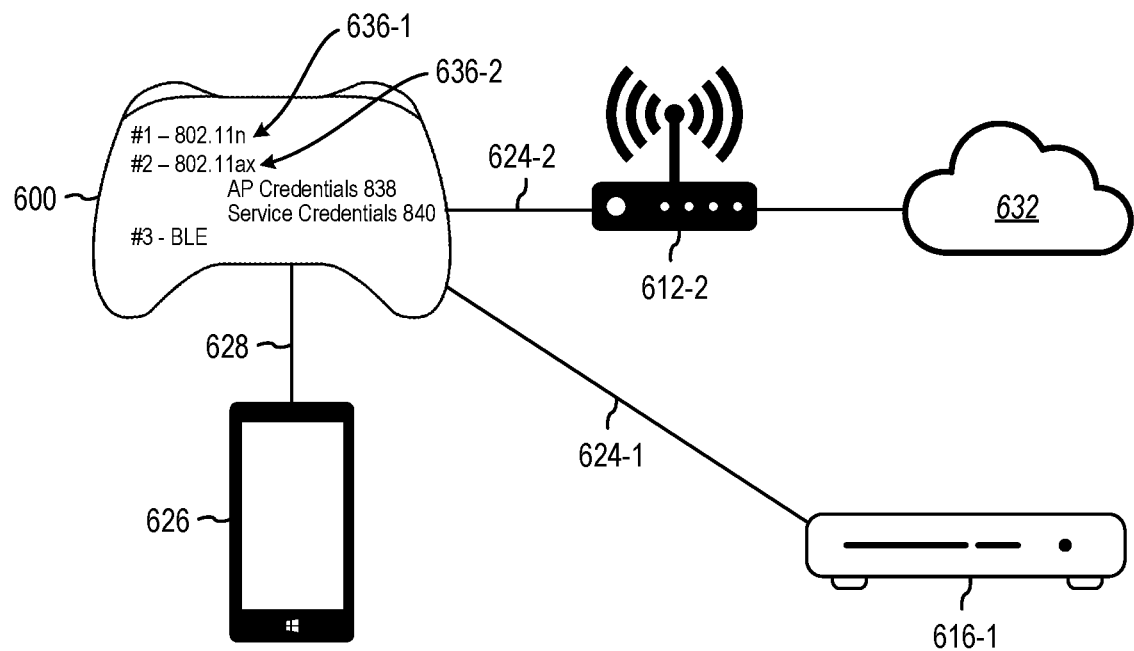
FIG. 6 is a system diagram of an accessory device with stored data channel personalities associated with a plurality of host devices, according to at least some embodiments of the present disclosure.

FIG. 6 illustrates another embodiment of a system according to the present disclosure. In some embodiments, the control device 626 and/or control application manages the data channel personality selection and/or management. The control device 626 and/or control application may allow the creation of a first data channel personality 636-1, such as creating a game console data channel 624-1 using 802.11n protocol. The details associated with the game console data channel 624-1 using 802.11n protocol may be stored locally on the accessory device 600. The control device 626 and/or control application may allow the creation of a second data channel personality 636-2, such as creating a cloud-direct data channel personality that includes SSID information, access point credentials, and cloud-based service credentials to access a cloud-based service 632 via a cloud service data channel 624-2 through a second host device 616-2 (e.g., access point). In some embodiments, the second data channel personality 636-2 may be the same protocol as the first data channel connection 636-1, such as pairing information to a different game console using the 802.11n protocol. The accessory device 600 can then precisely switch between data channels with different host devices with a similar communication protocol.

The control device 626 and/or control application may adjust the total number of available data channel personalities 636-1, 636-2. In another example, a first cloud-direct data channel personality may allow the accessory device to retain and reuse login credentials for a first cloud-based service and a second cloud-direct data channel personality may allow the accessory device to retain and reuse login credentials for a second cloud-based service. In other examples, a first cloud-direct data channel personality may allow the accessory device to retain and reuse first SSID and access point credential with login credentials to connect to a cloud-based service and a second cloud-direct data channel personality may allow the accessory device to retain and reuse second SSID and access point credentials with login credentials for the cloud-based service. The accessory device may then select different access points or frequencies of an access point to connect to the cloud-based service.

The control device 626 and/or control application may enable device pairing by providing a display and/or input mechanisms by which network or pairing information may be entered to the accessory device 600 over the control channel 628. For example, some devices require a code to be entered to confirm a pairing of devices over Bluetooth. In other examples, the SSID may be selected on a display of the control device 626, and a network passcode entered on a keyboard, to provide the accessory device 600 with the network information for a data channel 624-2 to an access point 616-2.

In some embodiments, the control device and/or control application includes a list of data channel personalities. The desired data channel personality may be selected from the list or through another selection mechanism to instruct the accessory device, via the control channel, to change the radio firmware, vendor radio firmware, and control firmware in system memory of the accessory device. In at least one example, user account information is stored on the control device and/or control application to provide greater security for the user's account. In the event that a game controller is lost, the game controller alone would not be able to connect to the user's cloud-based service account without the control device and/or control application, also.

In some embodiments, the accessory device allows data channel personality selection, cycling, or management by one or more manual inputs into buttons, switches, triggers, sticks, touch sensitive surfaces, or directional pads. For example, a sliding switch with four positions may select (and indicate) the active data channel personality on the accessory device. For example, a first position may select a first data channel personality (802.11n), a second position may select a second data channel personality (802.11ax), a third position may select a third data channel personality (Bluetooth data channel), and a fourth position may select a fourth data channel personality (Cloud-direct via access point).

Figure 7:
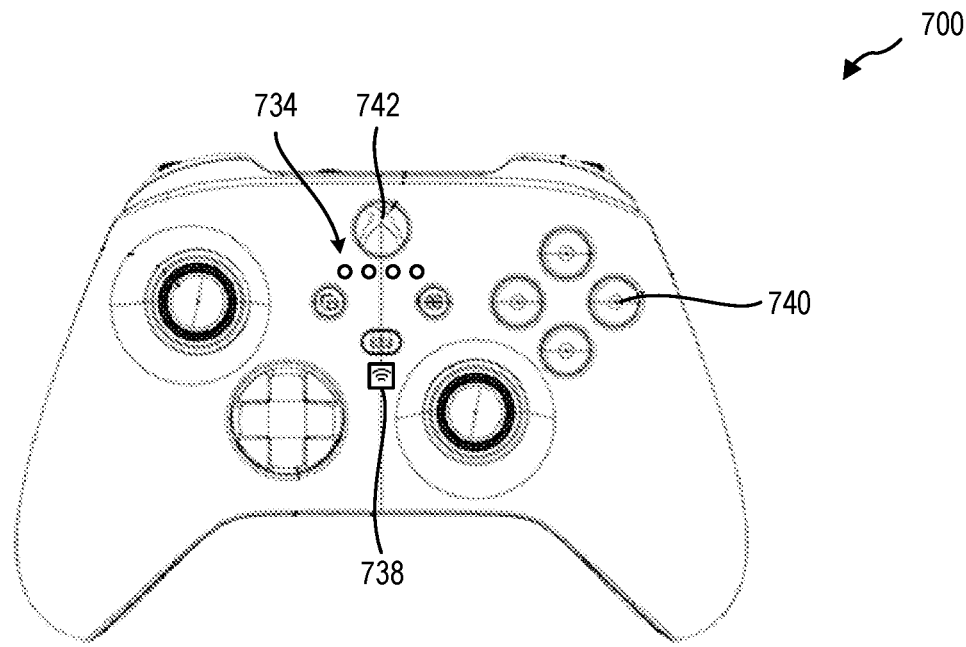
FIG. 7 is a front view of an accessory device with a personality button, according to at least some embodiments of the present disclosure.

In other embodiments, the manual input may be to a personality button 738 on a face of the accessory device 700, such as illustrated in FIG. 7, where the personality button 738 cycles through stored data channel personalities, such as those created by the control device and/or control application. As described herein, a status light 734 or plurality of status lights may indicate the active data channel personality. In at least one example, a display screen of the accessory device 700 may display the active data channel personality.

In the example of a game controller, the manual input may include one or more of the digital input buttons 740 located on the game controller that are conventionally used for game inputs. For example, depressing the personality button 738 alone may cycle through stored data channel personalities, while depressing the personality button 738 in combination with the "X" button may select the 802.11ax game console data channel personality. Different button combinations may select different data channel personalities. In at least one embodiment, the personality button 738 only changes the active data channel personality when depressed in combination with at least one other input button 740. For example, a system button 742 (e.g., the "Xbox button" or "PlayStation button" in the MICROSOFT XBOX ELITE SERIES 2 CONTROLLER or the SONY DUALSENSE CONTROLLER, respectively) may call up a top menu or operating system main screen when depressed alone, and the system button 742 may function as a personality button 738 when depressed in combination with another input button 740.

In some embodiments, the accessory device 700 selects the data channel personality automatically without explicit user input. In some embodiments, the control device and/or control application automatically sends instructions to the accessory device 700 to select a data channel personality automatically without explicit user input. The data channel personality may be automatically selected based on the information stored in or associated with the data channel personalities of the accessory device 700. In some embodiments, the accessory device 700 may store, in non-volatile memory, the last-used data channel personality and reload the last-used data channel personality.

Figure 8:
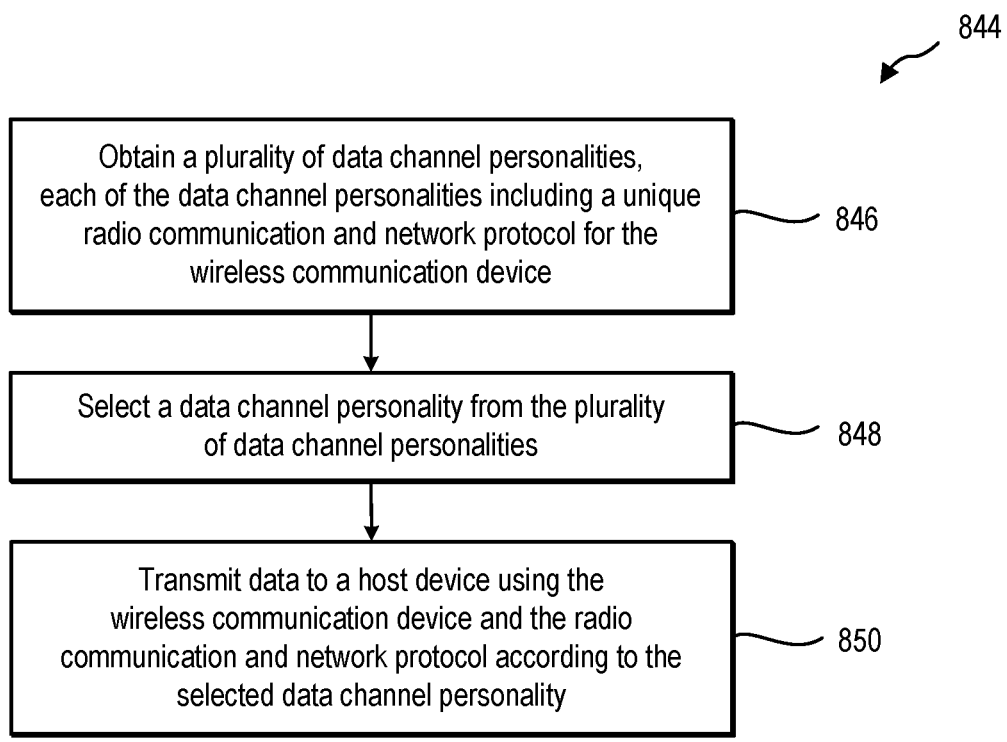
FIG. 8 is a flowchart illustrating a method of changing data channel personalities, according to at least some embodiments of the present disclosure.

FIG. 8 illustrates a method 844 of communicating between an accessory device and a host device by obtaining a plurality of data channel personalities at 846, wherein each of the data channel personalities includes a unique radio communication and network protocol for the wireless communication device of the accessory device. The plurality of data channel personalities may be obtained from the hardware storage device of the accessory device or provided to the system memory of the accessory device by a control device via a control channel.

The method 844 further includes selecting a data channel personality from the plurality of data channel personalities at 848 and loading the firmware into system memory associated with the selected data channel personality. The accessory device can then transmit data to a host device using the wireless communication device of the accessory device according to the selected data channel personality at 850. As described herein, the data channel personality may be selected at 848 through manual inputs on the accessory device or through selections made by user inputs to the control device or control application.

In some embodiments, a data channel personality may be automatically selected at 848 based on a recognized RF signal in the presence of the accessory device. The accessory device and/or control device may detect the presence of a known host device through advertising on the appropriate frequency. In the event only one known host device is present or detected, the accessory device may select that the associated data channel personality to establish the data channel with that host device. For example, a user may use a game controller at their home with a game console with a first data channel personality and at another location to play cloud-based games with a second data channel personality. When a presence of the game console is detected by the accessory device and/or control device, the accessory device may select the first data channel personality, and when a presence of the known SSID stored in the cloud-direct data channel personality is detected, the accessory device may select the second data channel personality.

In some embodiments, the plurality of data channel personalities has a priority list of the data channel personalities. When the presence of more than one data channel personality is detected, the accessory device may select the first data channel personality, for example, when the accessory device is in proximity to a known game console, the accessory device may prioritize connection with the game console. An example of this would be when the user uses the game controller at their home with their home console and connects to an access point at a friend's house to play cloud-based games. In the event that the user brings their console to their friend's house, the game controller would detect both the game console and access point as potential host devices. The game controller would prioritize the data channel personality associated with the game console.

The data channel personality may be automatically selected based on a calculated proximity to a recognized RF signal when a plurality of recognized RF signals is present. The accessory device and/or the control device may determine a proximity to a host device based on the strength of an RF signal therebetween. For example, the accessory device may determine a distance to a known host device by establishing a wireless data connection with the host device and measuring a distance to the host device based on a round trip time or other distance measurement method. The accessory device and/or control device may automatically select a data channel personality based on the host device that is physically closest to the accessory device, inferring that the user intends to use the accessory device with host device closest to the accessory device. While host devices are in communication range with the accessory device, this method may be useful in automatically selecting the appropriate data channel personality between an 802.11ax data channel personality to connect to a game console in the user's living room and a BLE data channel personality to connect to a PC in the user's home office.

The data channel personality may be automatically selected based on the location of the accessory device and/or the control device. For example, the accessory device and/or control device may determine a physical location of the accessory device based on an IP address or a GPS location. In some embodiments, a first physical location of the accessory device may be associated with a cloud-direct data channel personality, and a second physical location of the accessory device is associated with a Wi-Fi-based game console data channel personality.

In some embodiments, the accessory device and/or control device (or control application) may use a combination of techniques described herein to automatically select a data channel personality. For example, the accessory device may have, stored thereon, a data channel personality associated with a BLE data channel with the user's smartphone (which may or may not be the control device). The user will commonly have their smartphone on their person or nearby, such that the smartphone is frequently the physically closest potential host device to the accessory device irrespective of where the user is using the accessory device. In such an example, the accessory device may automatically select a data channel personality based on proximity, presence, location, or other method except for automatically selecting the smartphone.

In at least one embodiment, the accessory device and/or the control device (or control application) automatically selects the data channel personality to be used based on one or more logic or machine learning (ML) models. For example, the accessory device and/or the control device (or control application) may record usage information for a data channel personality or for the accessory device, such as the identity of a user using the accessory device, the location of the accessory device and/or the control device during use, the duration of use, the time of day, day of the week, etc. The usage information may be provided to the one or more ML models and/or compared to an existing ML model to better predict the appropriate data channel personality to be selected. For example, the usage information may indicate that the user exclusively plays cloud-based games after 10:00 pm. In another example, the usage information may indicate that the user has never used the accessory device in the current physical location, and the accessory device or control device may select the cloud-direct data channel personality to load the appropriate radio firmware in anticipation of connecting to an access point for cloud-based services.

A ML model, according to the present disclosure, refers to a computer algorithm or model (e.g., a classification model, a regression model, a language model, an object detection model) that can be tuned (e.g., trained) based on training input to approximate unknown functions. For example, a machine learning model may refer to a neural network or other machine learning algorithm or architecture that learns and approximates complex functions and generate outputs based on a plurality of inputs provided to the machine learning model. In some implementations, a machine learning system, model, or neural network described herein is an artificial neural network. In some implementations, a machine learning system, model, or neural network described herein is a convolutional neural network. In some implementations, a machine learning system, model, or neural network described herein is a recurrent neural network. In at least one implementation, a machine learning system, model, or neural network described herein is a Bayes classifier. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs. In at least one embodiment, the ML model is a supervised or semi-supervised model that is trained using a plurality of known user behaviors and/or known accessory device usage information.

Figure 9:
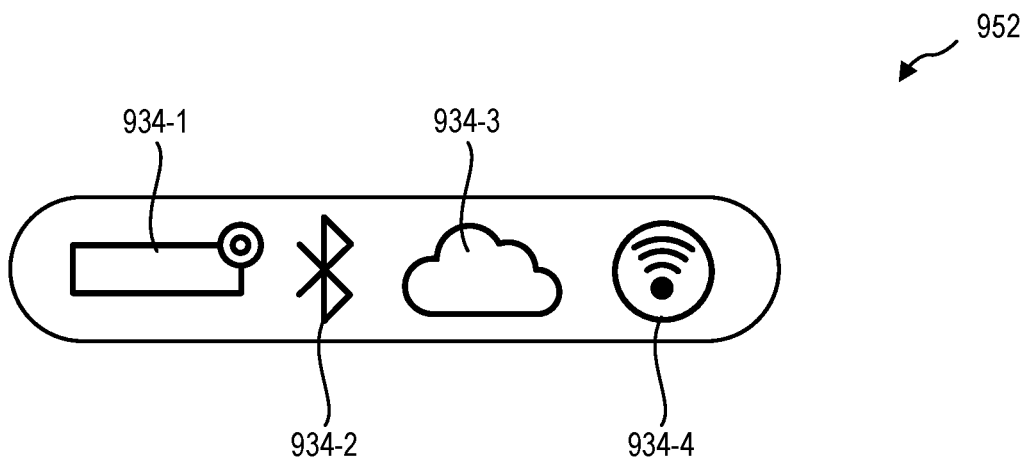
FIG. 9 illustrates a status bar, according to at least some embodiments of the present disclosure.

In some embodiments, a status indicator, such as described in relation to FIG. 5 and FIG. 7, visually communicates to a user the data channel personality that is active, pending, available, or recently failed between the accessory device and a host device. FIG. 9 illustrates an embodiment of a status bar 952 with a plurality of status lights 934-1, 934-2, 934-3 of an accessory device. In some embodiments, the status lights 934-1, 934-2, 934-3 are each a symbol indicating a different communication protocol of the accessory device. In some embodiments, the status bar 952 includes a configurable screen that displays one or more symbols associated with an active, pending, available, or recently failed data channel personality. In at least one embodiment, the configurable screen displays a plurality of symbols associated with available endpoint connections and touching or otherwise interacting with the configurable screen selects a data channel personality associated with the symbol depicted thereon.

As described herein, in some embodiments, a status indicator such as the status bar 952 is located proximate to a surface of the body of the accessory device to allow a user to view the status of the data channel personality without a separate device or screen. In some examples, the status bar 952 is located on a surface of the body of the accessory device, such as affixed to the surface of the body. In some examples, the status bar 952 is located in a surface of the body of the accessory device, such as lights embedded in the surface of the body. It should be understood that the status indicator or status bar 952 may be located proximate any surface of the body of the accessory device, including the front surface, top surface, back surface, etc.

In some embodiments, the first status light 934-1 includes a symbol representing a game console communication protocol configured to communicate with a game console, such as 802.11n, 802.11ax, or another wireless communication protocol with a game console such as described in relation to FIG. 3. In at least one example, the game console communication protocol is a proprietary communication protocol such as XBOX DIRECT. In some examples, the game console communication protocol uses 2.4 GHz RF transmissions, 5.0 GHz RF transmissions, or other frequency or frequency ranges of RF transmissions. At least one data channel personality using the game console communication protocol may be stored on the hardware storage device of the accessory device to allow the accessory device to establish an endpoint connection with a previously paired game console.

In some embodiments, the second status light 934-2 includes a symbol representing a BLUETOOTH communication protocol configured to communicate with another host device, such as a laptop computer, a desktop computer, a smartphone, a tablet computer, a hybrid tablet-laptop computer, a television or other display device, or another electronic device. In some embodiments, the BLUETOOTH communication protocol is or includes BLUETOOTH LOW ENERGY (BLE) communications. At least one data channel personality using the BLUETOOTH communication protocol may be stored on the hardware storage device of the accessory device to allow the accessory device to establish an endpoint connection with a previously paired host device.

In some embodiments, the third status light 934-3 includes a symbol representing a Cloud-Direct communication protocol, such as described herein in relation to FIG. 4. The Cloud-Direct communication protocol allows the accessory device to communicate with a cloud service via an access point to a network. At least one data channel personality (including access point credentials and/or cloud service credentials) using the Cloud-Direct communication protocol may be stored on the hardware storage device of the accessory device to allow the accessory device to establish an endpoint connection with a previously paired access point and/or cloud service.

With stored data channel personalities (and, optionally, credentials as needed), the accessory device can switch between the communication protocols associated with the first status light 934-1, the second status light 934-2, and the third status light 934-3 and communicate the active communication protocol and/or endpoint connection intuitively to a user via the symbols.

In some embodiments, the status bar further includes a personality button 938 configured to change the selected endpoint connection. For example, the personality button 938 may transmit a data channel personality change request to a processor of the accessory device. The data channel personality request then causes the processor to increment through or select from a list of stored data channel personalities stored on the hardware storage device of the accessory device.

Figure 10:
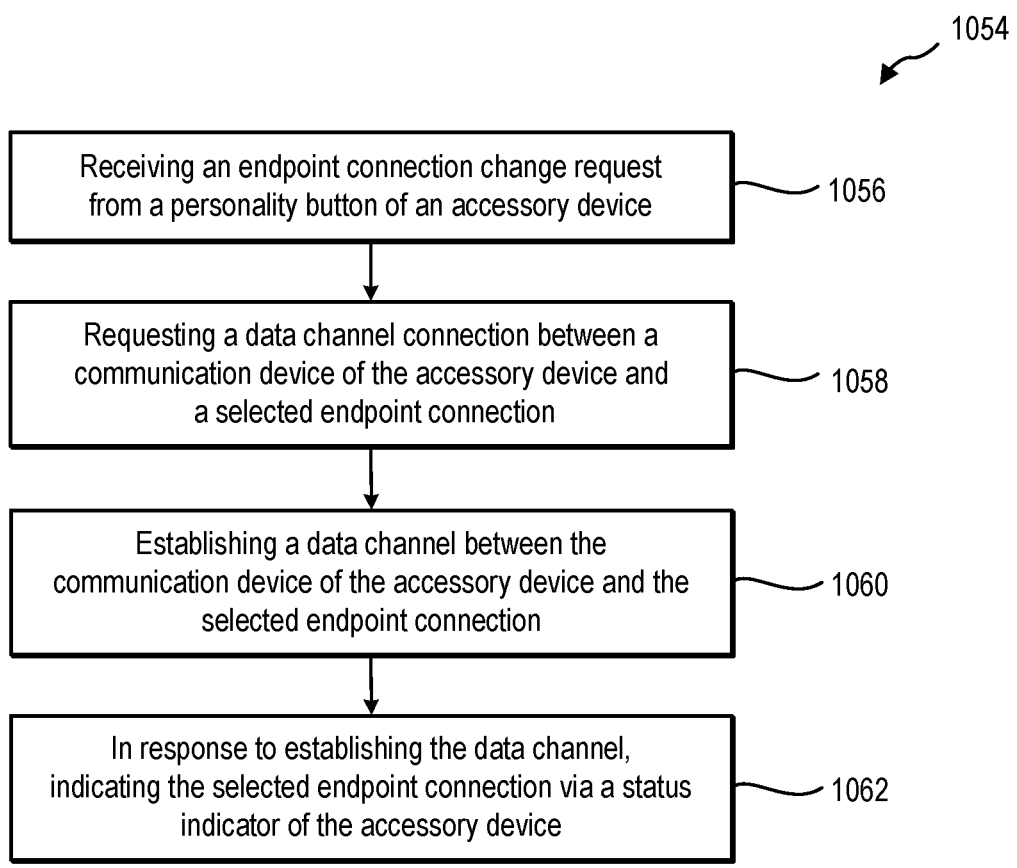
FIG. 10 is a flowchart illustrating a method of indicating a data channel personality status on an accessory device, according to at least some embodiments of the present disclosure.

FIG. 10 is a flowchart illustrating a method 1054 of selecting an endpoint connection from an accessory device, according to some embodiments of the present disclosure. The method 1054 includes receiving an endpoint connection change request or data channel personality change request from a personality button of an accessory device at 1056. In some embodiments, depressing the personality button transmits the endpoint connection change request or data channel personality change request from the personality button to a processor of the accessory device. In some embodiments, double-pressing the personality button (e.g., pressing twice without a predetermined time period) transmits the endpoint connection change request or data channel personality change request to limit and/or prevent intended endpoint connection change requests or data channel personality change requests.

In some embodiments, the method 1054 includes requesting a data channel connection between a communication device of the accessory device and a selected endpoint connection at 1058. In some embodiments, the accessory device is in data communication with a control device via a control channel, such as via BLE, and remains in data communication with the control device via the control channel while the data channel changes in response to the endpoint connection change request or data channel personality change request from the personality button. In some embodiments, requesting a data channel connection between a communication device of the accessory device and a selected endpoint connection includes the processor accessing and transmitting stored credentials via the communication device.

In some embodiments, requesting a data channel connection between a communication device of the accessory device and a selected endpoint connection includes changing communication protocols and/or changing a transceiver of the communication device, such as changing from a game console data channel personality using a 2.4 GHz RF connection to a Cloud-Direct data channel personality using a 5.0 GHz Wi-Fi 6 connection to an access point to communicate with a cloud service. In some embodiments, requesting a data channel connection between a communication device of the accessory device and a selected endpoint connection includes using the same communication protocols and/or transceiver of the communication device but changing endpoint connection, such as changing from communicating with a first host device via a BLUETOOTH connection with stored pairing information to communicating with a second host device via a BLUETOOTH connection with stored pairing information.

The method 1054 further includes establishing a data channel between the communication device of the accessory device and the selected endpoint connection at 1060. Establishing a data channel may include receiving a response from the host device of the endpoint connection. In response to establishing the data channel, the method 1054 includes indicating the selected endpoint connection via a status indicator of the accessory device at 1062. As described herein, indicating the selected endpoint connection via a status indicator may include illuminating a status light. The status light may be or include a symbol corresponding to the communication protocol and/or endpoint connection of the data channel.

In some embodiments, the status indicator includes an audio indicator for endpoint connection. For example, the status indicator outputs an audio signal to an audio output device. The audio output device may then play an audible sound to the user to indicate that an endpoint connection has been selected, an endpoint connection has been established, an error has occurred in endpoint connection, or other status of the endpoint connection.

In some embodiments, the status indicator includes a haptic indicator for endpoint connection. For example, the status indicator includes a haptic indicator that uses a linear haptic device (such as a VCA), an ERM, other haptic device, or combinations thereof. The status indicator outputs a haptic signal to the haptic device(s), which, in turn, produce a haptic output through the accessory device to the user to indicate that an endpoint connection has been selected, an endpoint connection has been established, an error has occurred in endpoint connection, or other status of the endpoint connection.

Figures 1, 11:
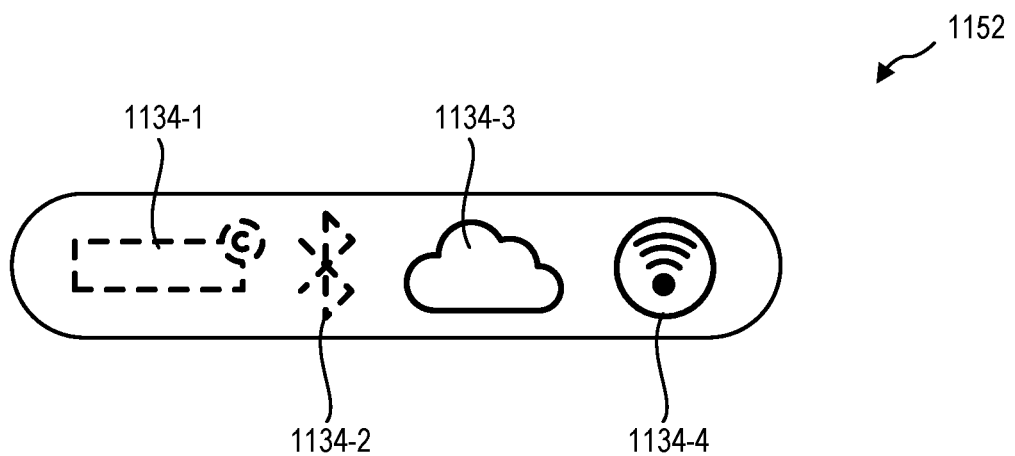
Figures 2, 11:
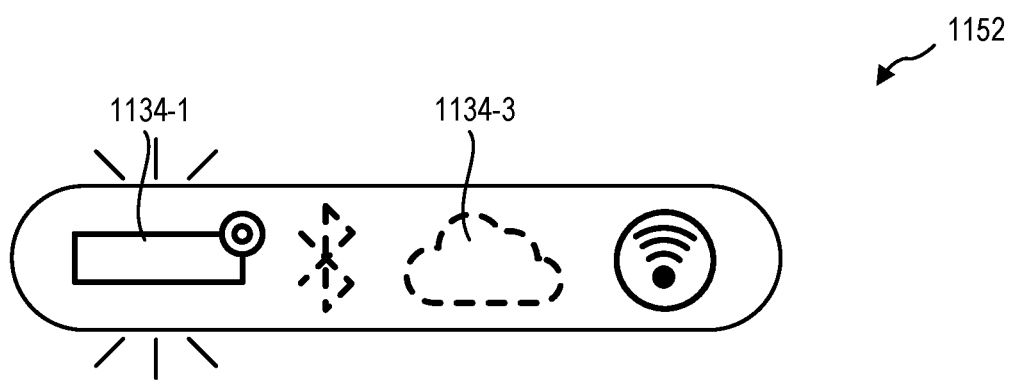
Figures 3, 11:
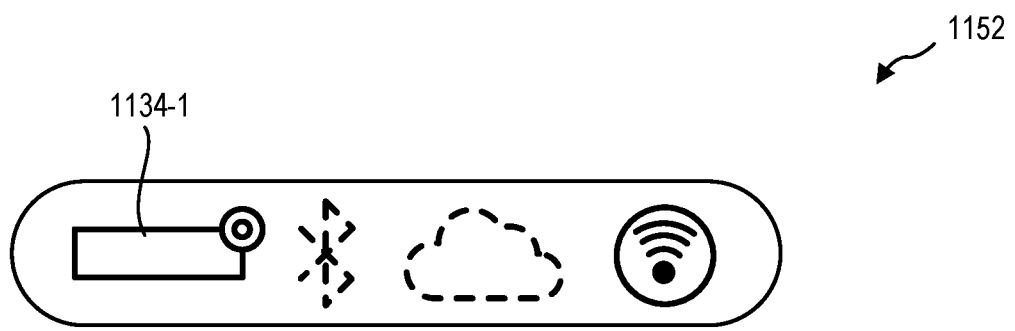

FIG. 11-1 through FIG. 11-3 illustrate an embodiment of a status bar 1152 that visually indicates a status of the endpoint connection. In some embodiments, the status bar 1152 includes a plurality of status lights 1134-1, 1134-2, 1134-3 that include symbols corresponding to different communication protocols. In some embodiments, the status light 1134-1, 1134-2, 1134-3 selectively illuminate and/or dim to communicate a status of the communication protocols and/or endpoint connections associated therewith. In some embodiments, the first status light 1134-1 (which is illustrated as including a game console symbol) is dimmed and a second status light 1134-2 (which is illustrated as including a BLUETOOTH symbol) is dimmed, while a third status light 1134-3 is illuminated, indicating an active Cloud-Direct data channel and/or endpoint connection.

Upon interacting with the personality button 1138, such as by depressing, double-pressing, touching, etc., the accessory device changes data channel personalities as described herein and begins establishing a new endpoint connection according to the data channel personality. While the accessory device attempts to establish the data channel with the new endpoint connection, the pending endpoint connection is indicated to the user by the flashing first status light 1134-1 and the dimmed third status light 1134-3, such as shown in the embodiment of FIG. 11-2. The flashing first status light 1134-1 indicates that the accessory device is attempting to establish a data channel with a host device or endpoint connection associated with a game console data channel personality. Conversely, the dimmed third status light 1134-3 indicates that the accessory device no longer has an active data channel in communication with the cloud service associated with a Cloud-Direct data channel personality. FIG. 11-3 illustrates a continuously illuminated first status light 1134-1 that indicates a successfully established data channel with the endpoint connection associated with the game console data channel personality.

Figure 12:
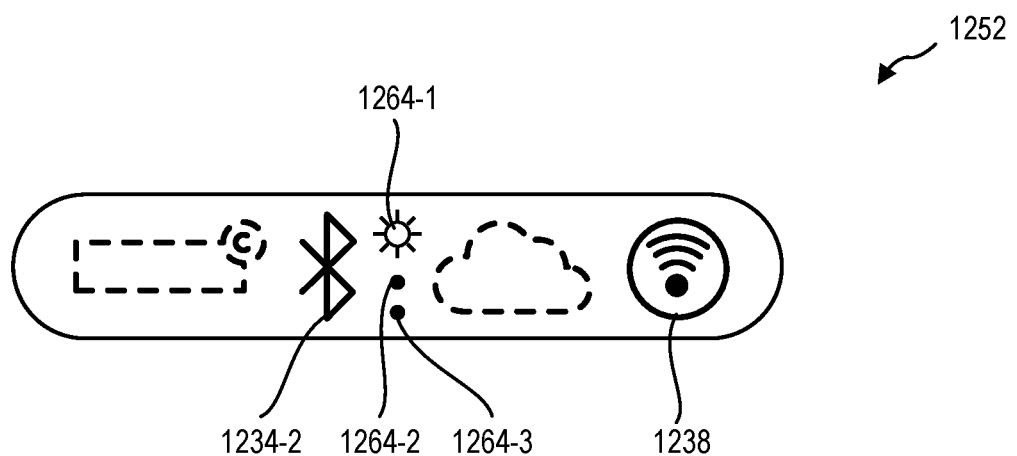
FIG. 12 illustrates a status bar with secondary status light, according to at least some embodiments of the present disclosure.

In some embodiments, an accessory device has a plurality of stored endpoint connections or stored data channel personalities associated with a communication protocol. FIG. 12 illustrates an embodiment of a status bar 1252 with a second status light 1234-2 that includes secondary status lights 1264-1, 1264-2, 1264-3 that indicate different endpoint connections and/or different data channels associated with the BLUETOOTH communication protocol. In some embodiments, a first input to the personality button 1238, such as depressing the personality button 1238, transmits a request to change communication protocol, while a second input to the personality button 1238, such as double-pressing the personality button 1238, transmits a request to change device connections of the communication protocol. For example, a double-press to the personality button 1238 may transmit a device change request within the BLUETOOTH communication protocol, and the first secondary status light 1264-1 is illuminated to indicate that a first endpoint connection of the BLUETOOTH communication protocol is active. The second secondary status light 1264-2 and the third secondary status light 1264-3 are dimmed.

Because the visual status indicators may be illuminated to indicate active endpoint connections, the light from the status indicator may be distracting or confusing to a user while using the accessory device. In some embodiments, the status indicator and/or the personality button (or other input mechanism for requesting a data channel personality change) may be selectively enabled to limit and/or prevent distractions or unintended data channel personality changes.

Figure 13:
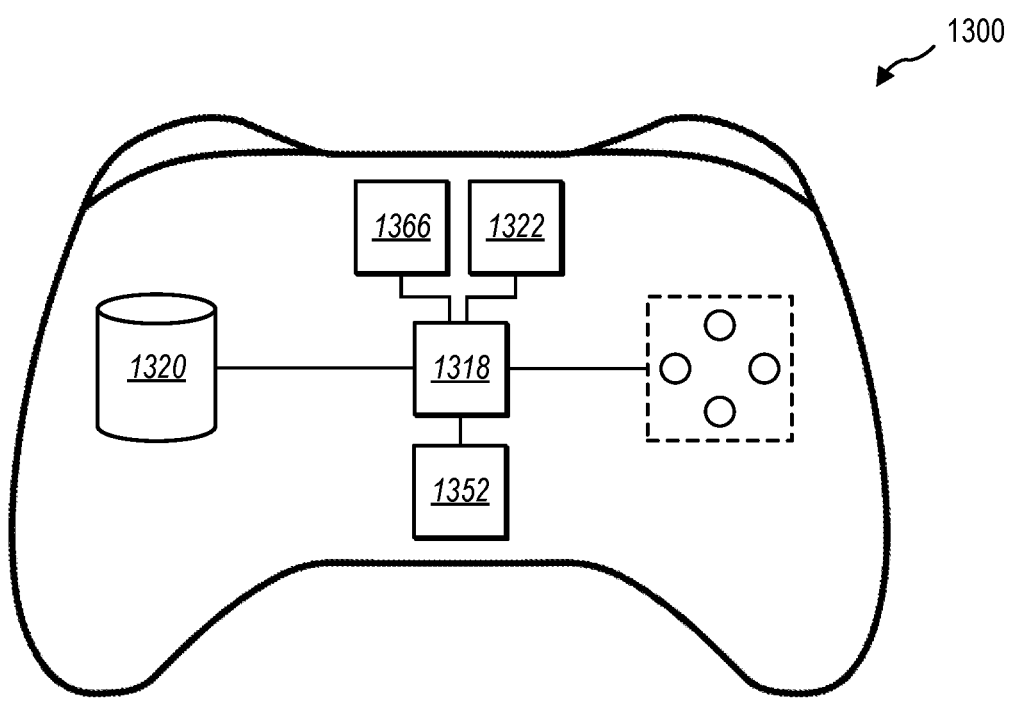
FIG. 13 is a schematic diagram of an accessory device including a motion sensor, according to at least some embodiments of the present disclosure.

FIG. 13 is a schematic illustration of an accessory device 1300 with a motion sensor 1366 in data communication with a processor 1318. The processor 1318 is further in data communication with a status bar 1352, such as embodiments of the status bar 1152, 1252 described in relation to FIG. 11-1 through FIG. 12. In some embodiments, the motion sensor 1366 includes a gyroscope, an accelerometer, or other sensors configured to measure a movement and/or orientation of the accessory device 1300. For example, the motion sensor 1366 may transmit motion information to the processor 1318, which based at least partially on the motion information and instructions accessed from the hardware storage device 1320, selectively enables or disables the status bar (which includes status indicators and/or a personality button). In some embodiments, the motion information may be transmitted directly to the status bar 1352 to selectively enable or disable at least part of the status bar. While the embodiment of the accessory device 1300 of FIG. 13 includes a status bar, it should be understood that a motion sensor may provide motion information to a processor to selectively enable or disable other status indicators (such as haptic or audio status indicators) and/or other input mechanisms for data channel personality changes. The processor 1318 may then change the data channel personality of the communication device 1322.

Figures 1, 14:
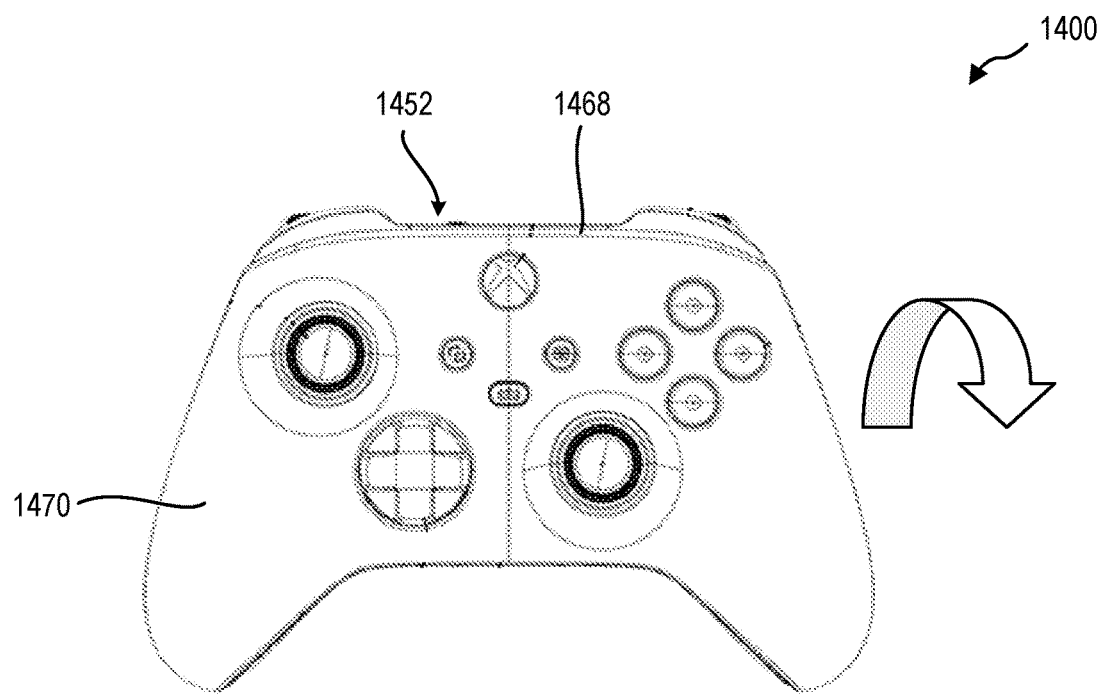
Figures 2, 14:
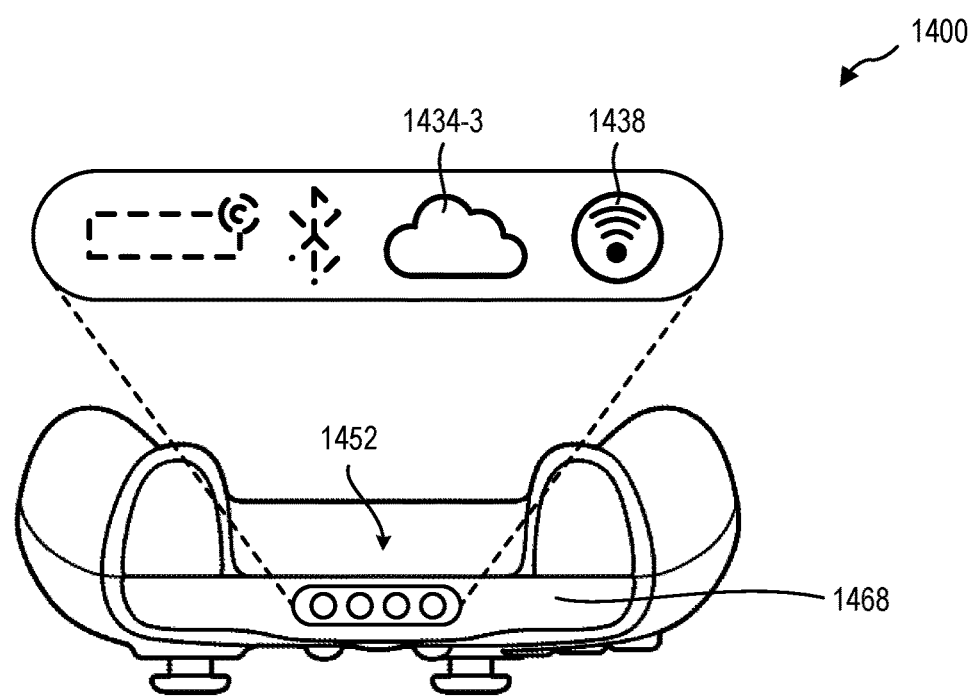

FIG. 14-1 is a front view of an embodiment of an accessory device 1400 including a status bar 1452 located on a top edge 1468 of the accessory device 1400. During conventional use of the accessory device 1400 (e.g., during navigation of system menus and/or during interaction with an interactive software application (e.g., game application)), a user holds the accessory device 1400 with the front face 1470 of the accessory device 1400 facing the user and the top edge 1468 oriented away or perpendicularly to the user. As the status bar 1452 is oriented away from the user during conventional usage, the status bar 1452 (including status indicators and/or a personality button) may be selectively deactivated when the motion sensor indicates the accessory device 1400 is being held in a conventional flat orientation. When the user rotates the accessory device 1400 to orient the top edge 1468 upward toward the user (e.g., when the top edge 1468 is oriented within 45° of straight upward), the motion sensor transmits motion information to the processor of the accessory device 1400 to enable and/or illuminate at least part of the status bar 1452.

In some embodiments, the processor selectively enables one or more status indicators in response to the motion information. For example, when the motion information indicates the status bar 1452 is oriented upward as illustrated in FIG. 14-2, the third status light 1434-3 associated with the active selected endpoint connection (e.g., Cloud-Direct data channel personality) is illuminated. In some examples, additional haptic or audio status indicators are enabled. In some embodiments, the processor of the accessory device 1400 selectively enables one or more input mechanisms, such as a personality button 1438, in response to the motion information. For example, when the motion information indicates the status bar 1452 is oriented upward, the personality button 1438 is enabled to allow the user to input a data channel personality change request via the personality button 1438.

Conversely, when the motion information indicates the status bar 1452 is not oriented upward (e.g., the accessory device 1400 has returned to the flat orientation of FIG. 14-1), the processor may selective disable at least a portion of the status bar 1452. For example, the status lights may dim to reduce distractions for the user during use of the accessory device (such as in a dark room) and/or the personality button 1438 may be disabled to limit and/or prevent unintentional inputs during usage.

In other embodiments, at least part of the status bar, the status indicator(s), input mechanisms for changing data channel personalities, and combinations thereof are selectively enabled or disabled according to other conditions or criteria. In some examples, the at least part of the status bar, the status indicator(s), input mechanisms for changing data channel personalities, and combinations thereof are active for a predetermined time period after the accessory device is powered on. For example, the status bar may be active for the first 10 seconds after turning the accessory device on, providing the user with an opportunity to view the active endpoint connection and, if desired, input a data channel personality change request via the personality button. In some embodiments, the time period resets upon inputting a data channel personality change request via the personality button. In some embodiments, the time period resets upon establishing an endpoint connection.

Figure 15:
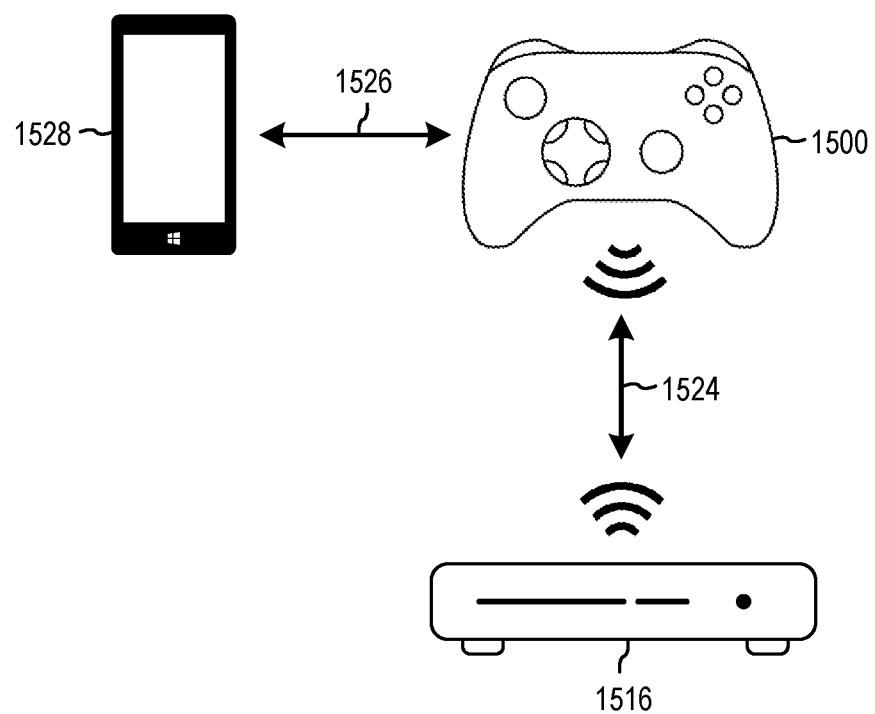
FIG. 15 is a system diagram illustrating an accessory device with a selectively enabled status bar based on host device status information, according to at least some embodiments of the present disclosure.

FIG. 15 illustrates an embodiment of a system including an accessory device 1500 in data communication with a host device 1516 via a data channel 1524 and in data communication with a control device 1528 via a data channel 1526. In some embodiments, the accessory device 1500 selectively enables or disables at least part of the status bar, the status indicator(s), input mechanisms for changing data channel personalities, and combinations thereof based at least partially on transmissions from the host device 1516. For example, the user may desire to input a data channel personality change request only when in system menus or a top menu of the host device operating system, and the user may desire to limit and/or prevent an input of a data channel personality change request during interaction with an interactive software application. In a specific example, the user may desire to limit and/or prevent an input of a data channel personality change request on a game controller during gameplay of a game application executed on the host device 1516. In some embodiments, the host device 1516 transmits a host status signal to the accessory device that informs the accessory device of a status of the host device, and based at least partially on the host status signal, the accessory device selectively enables or disables at least part of the status bar, the status indicator(s), input mechanisms for changing data channel personalities, and combinations thereof.

In some embodiments, upon failure of the data channel 1524 with the host device 1516, either during establishment of the data channel 1524 or failure of the data channel 1524 after establishment, the accessory device 1500 transmits a message to the control device 1528 providing additional information regarding the failure. For example, when the accessory device 1500 receives a data channel personality change request and attempts to establish a new channel according to the selected data channel personality, if the accessory device is unable to establish the new data channel, the accessory device 1500 indicates to the user, via a status indicator, the failure and transmit, via the control channel 1526, additional failure information and/or troubleshooting information to the control device 1528 for the user to review.

In at least some embodiments of the present disclosure, an electronic device includes status indicators and/or input mechanisms to allow native selection and intuitive awareness of different communication protocols with different endpoint connections. In some embodiments, the accessory device selectively enables or disables at least part of the status bar, the status indicator(s), input mechanisms for changing data channel personalities, and combinations thereof to reduce distractions and limit and/or prevent unintended switching of endpoint connections.

INDUSTRIAL APPLICABILITY

The present disclosure relates generally to allowing a user to change an endpoint connection with a host device via an accessory device. More particularly, the present disclosure relates generally to systems and methods for allowing a user to intuitively and clearly select and change an endpoint connection between a plurality of host devices via an accessory device. In some embodiments, an accessory device includes a status indicator that clearly and intuitively indicates a currently selected and/or connected endpoint connection with a host device. In some embodiments, the accessory device includes a status bar with a plurality of icons located on the status bar that correspond to a plurality of communication protocols. For example, a status bar may include a first icon associated with a game console communication protocol (e.g., 802.11n or 802.11ax communication), a second icon associated with a different RF communication protocol to a different host device (e.g., BLUETOOTH communication protocols), and a third icon associated with a Cloud-Direct communication protocol with a network access point.

In some embodiments, the status bar includes further indicators that communicate different endpoint connections of a communication protocol. For example, a status bar may include device indicators that indicate to a user a selected endpoint connection or selected host device within a selected communication protocol. In at least one example, the status bar indicates to a user a Cloud-Direct communication protocol with a Cloud-Direct icon, while further indicators indicate a selected stored credential or a selected cloud service with which the accessory device is in communication. In at least another example, the status bar indicates to a user a Cloud-Direct communication protocol with a Cloud-Direct icon, while further indicators indicate a selected stored credential or a selected cloud service with which the accessory device is in communication.

In some embodiments, the status indicator includes an audio indicator for endpoint connection. For example, the status indicator outputs an audio signal to an audio output device. The audio output device may then play an audible sound to the user to indicate that an endpoint connection has been selected, an endpoint connection has been established, an error has occurred in endpoint connection, or other status of the endpoint connection.

In some embodiments, the status indicator includes a haptic indicator for endpoint connection. For example, the status indicator includes a haptic indicator that uses a linear haptic device (such as a voice coil actuator (VCA)), an eccentric rotating mass (ERM), other haptic device, or combinations thereof. The status indicator outputs a haptic signal to the haptic device(s), which, in turn, produce a haptic output through the accessory device to the user to indicate that an endpoint connection has been selected, an endpoint connection has been established, an error has occurred in endpoint connection, or other status of the endpoint connection.

In some embodiments, an accessory device includes an input mechanism on the accessory device to select and/or change an endpoint connection with a host device. In some embodiments, the input mechanism is a dedicated button, such as a personality button, that increments through or selects from a plurality of data channel personalities, where each data channel personality is associated with a different endpoint connection. In some embodiments, the input mechanism is secondary function of another input device on the accessory, such as face buttons or menu buttons of a game controller pressed in combination, as will be described in more detail herein.

In some embodiments, the input mechanism is selectively active for selecting or changing endpoint connections, such as when the accessory is oriented or moved in a particular manner or only during certain time periods after or during usage. For example, a selectively active input mechanism may receive endpoint connection change requests only when the accessory device is held upside-down from a conventional usage orientation or during a 5-second time period after turning the device on to limit and/or prevent unintentionally changing endpoint connections during use. In other examples, the accessory device receives a signal from a host device that instructs the accessory device to enable or disable (activate or deactivate) the input mechanism while the accessory device is in use with the host device. In at least one example, a game console host device transmits instructions to a game controller accessory device to disable the input mechanism while a game application is active, and the accessory device is being used to play the game application to limit and/or prevent unintentionally changing endpoint connections during gameplay.

In some embodiments, the accessory device includes a motion sensor that measures or determines an orientation or movement of the accessory device and selectively enables or disables the input mechanism in response to the orientation or movement of the accessory device. For example, the input mechanism (e.g., personality button) and/or status indicator (e.g., status bar) may be positioned on a top edge or back surface of the accessory device when held in a conventional orientation during use. When the accessory device is rotated toward the user to orient the top edge or back surface upward and/or toward the user, the accessory device activates the personality button.

In some embodiments, the status indicator is selectively active to avoid distracting the user during use of the accessory device. For example, the status indicator may be active only when the input mechanism is active. In some embodiments with an illuminated status bar or other illuminated status indicator, the status indicator may be active when the status indicator is oriented toward the user. For example, the status bar is in a dimmed state or unilluminated when a game controller is held flat, such as when held during use, while the status bar is in a bright state or illuminated when the user rotates the top edge of the controller upward toward the user. In some embodiments with a haptic status indicator, the accessory device selectively produces haptic outputs to limit and/or prevent distracting or confusing the user during conventional use of the accessory device such as playing a game application with a game controller or listening to audio information with headphones.

In some embodiments, the status indicator provides different visual, audio, or haptic outputs for an active connection, a pending connection, a successful connection, a failed connection or other events to communicate such events or states to the user. For example, a status bar may include a different symbol associated with different communication protocols. The status bar may flash the symbol associated with a pending selected endpoint connection while establishing the endpoint connection with the host device. The status bar may illuminate the symbol associated with an active selected endpoint connection in solid or continuously illuminated state. The status bar may flash in a different color and/or dim the symbol associated with a failed selected endpoint connection upon failure of an attempted endpoint connection with the host device.

In some embodiments, an accessory device includes a plurality of input buttons located on or in a body of the accessory device with at least one directional input device. The directional input devices may include one or more analog thumbsticks and/or one or more directional control pads. The input buttons may include face buttons, one or more menu or system buttons, shoulder buttons, trigger buttons, rear paddles, etc.

The thumbsticks and/or directional control pads may be used to control the movement of an avatar or cursor in a two- or three-dimensional virtual environment. The input buttons may be used to provide action commands (e.g., jump, crouch, defend, attack) to an avatar and/or interact with the environment. For example, a face button may be used to provide a jump command to an avatar in an adventure game application, while an analog trigger button may allow a user to precisely modulate a brake input for a racing game application.

In other examples, accessory devices may include audio output devices such as speakers or connection devices (e.g., a 3.5 mm audio jack, wireless radio) to communicate with speakers, audio input devices such as microphones or connection devices (e.g., a 3.5 mm audio jack, wireless radio) to communicate with speakers, haptic devices (e.g., linear haptic devices or eccentric rotating mass haptic devices), or other input or output devices that communicate with a host device. Due to the variety of input abilities and feedback abilities of accessory devices, it may be desirable to use a single accessory device with a plurality of host devices.

The accessory device may be configured to wirelessly communicate with a plurality of host devices using different communication methods and stored data channel personalities for those different communication methods. Conventional accessory devices, such as game controllers, speakers, headsets, keyboards, joysticks, and other human interface devices (HID) pair to a host device and remain paired to the host device until paired to a different host device. Even accessory devices that allow pairing to host devices over different frequencies or protocols conventionally remain paired with a single host device until paired with a different host device.

In some embodiments, an accessory device according to the present disclosure has stored thereon a plurality of data channel personalities that allow the accessory device to selectively change a data channel from a first host device using a first transceiver and/or first protocol to a second host device using a second transceiver and/or second protocol.

The accessory device includes a processor in communication with a hardware storage device. The hardware storage device can be any non-transient computer readable medium that may store instructions thereon. The hardware storage device may be any type of solid-state memory; volatile memory, such as static random access memory (SRAM) or dynamic random access memory (DRAM); non-volatile memory, such as read-only memory (ROM) including programmable ROM (PROM), erasable PROM (ERPOM) or EEPROM; magnetic storage media, such as magnetic tape; a platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory; or any other non-transient storage media. The hardware storage device includes instruction stored thereon that, when executed by the processor, cause the accessory device to perform any method or part of a method described herein. The hardware storage device or another hardware storage device has, stored thereon, at least one data channel personality.

The accessory device further includes a communication device, such as a radio frequency (RF) transceiver, that allows wireless transmission and receipt of data to the host device and/or control device. In some embodiments, the accessory device has a plurality of communication devices that provide communication at different frequencies or power levels to communicate with different host devices and/or control devices.

The data channel provides communication of state data, audio data, and other frequent communications between the accessory device and a host device. In some embodiments, the accessory device also communicates via a control channel with a control application that provides instructions to the accessory device to change data channel personality. In some embodiments, the control channel may broadcast other device information to the control application, such as current or available stored data channel personalities, current battery status of the accessory device, RSSI signal strength, or other functions. In some embodiments, the accessory device has at least one input mechanism locally on the accessory device to select, cycle through, or otherwise change the data channel personality. For example, the input mechanism may include face buttons, one or more menu or system buttons, shoulder buttons, trigger buttons, rear paddles, etc.

Some examples of data channel personalities stored on the accessory device include, but at not limited to Bluetooth or Bluetooth low energy (BLE), Wi-Fi 802.11ac, Wi-Fi 802.11n, Wi-Fi 802.11ax, or other wireless data communication protocol. For each of the wireless data communication protocols, one or more stored pairing information and/or credentials are stored on the accessory device 200. The accessory device 200 may, therefore, "remember" previously paired devices, allowing the transceiver of the accessory device to establish a data channel with the associated host device when a data channel personality is selected.

In some embodiments, a system includes an accessory device in communication with a host device by a data channel and with a control device via a first control channel. Other control channels may further allow device information to be communicated or shared between devices of the system. For example, a second control channel between the accessory device and the host device may allow communication of device health and device status information between the accessory device and the host device. A third control channel between the control device and the host device may allow communication of device health and device status information between the control device and the host device.

A data channel includes real-time or substantially real-time communication between the accessory device and the host device to allow a user to interact with a host application executed by the host device, such as a game application running on a game console (e.g., MICROSOFT XBOX, SONY PLAYSTATION, NINTENDO SWITCH). The host application may be natively executed on the host device. The host application may be a streamed game application executed on a cloud server and accessed through an access point (the host device) to which the accessory device has a data channel. For example, a game controller may transmit controller state data to the host device via the data channel to interact with a game application running on or accessed through the host device. In other examples, a headset may receive audio data from the host device via the data channel to represent the sounds in a game environment. In yet other examples, a game controller with a headset connected thereto may transmit chat audio data from the headset through the game controller to the host device via the data channel. In some embodiments, the data channel allows for transmission of data between the accessory device and host device at least every 2 milliseconds.

A control channel may allow non-latency-critical information to be transmitted between the accessory device and a control application or device. In some embodiments, the control device is different from the host device. For example, a control device may be a user's smartphone that communicates with the accessory device via the control channel while the accessory device communicates with a host device, such as a game console, via the data channel. In some embodiments, the control device is the host device, and a control application is different from the host application with which the accessory device communicates via the data channel. For example, a game controller may communicate with a game application running on a PC via a data channel while communicating with the control application also running on the PC via a control channel that is independent of the data channel. In such an example, selecting a different data channel personality for the accessory device in the control application will instruct the accessory device to establish a new data channel with a different host device.

In a particular embodiment, the accessory device is a game controller with a plurality of data channel personalities stored thereon. The game controller is in data communication with a control application running on a smartphone via a control channel. The control channel may be established using BLE between the game controller and the smartphone to target low bandwidth and latency-tolerant communication. The control channel allows the control application to send instructions to the game controller to select the game console data channel personality from the hardware storage device of the game controller. The game controller can then, via a Wi-Fi protocol such as 802.11n or 802.11ax, establish a data channel with the game console (i.e., host device) for a low-latency data connection to interact with the game application (or operating system or other application) running on the game console. The control channel may persist while the game controller changes data channel personalities and data channels with a plurality of host devices.

The data channel personality is changed by loading and transitioning the radio firmware, vendor radio firmware, and control firmware resident on the accessory device to the new personality. The radio firmware, vendor radio firmware, and control firmware associated with each data channel personality are stored locally on non-volatile memory on the accessory device.

In some embodiments, the data channel personalities use Wi-Fi, Bluetooth, and other RF frequencies. The data channel personalities may include a direct connection to a game console using 802.11n, a direct connection to a game console using 802.11ax, a Bluetooth connection using an isochronous data stream to a game console, PC, smartphone, or other computing device; a TCP/IP connection through an access point to a cloud datacenter, or other wireless data communication protocols. Only a single data channel personality is active at any time for reliable communication with the host device. Conversely, a plurality of control channels may be active at any time to allow communication of status information and/or latency tolerant data with the control device, the host device, and other devices.

In some embodiments, the accessory device can interact with cloud-based services through an access point with a Wi-Fi connection. The accessory device receives access point credentials and cloud-based service login credentials through the control channel to a control application or control device. In a specific example, a game controller may receive access point credentials to establish a data channel with a host device, such as a wireless access point, to access a cloud-based service via a network. The game controller may also receive login credentials to associate the game controller with the user's account on the cloud-based service. In other examples, the accessory device includes a screen and/or keyboard to allow manual input of the credentials and other information without the use of a control channel.

In a specific example, a game controller may establish a connection to the user's XBOX CLOUD GAMING account directly through an access point, reducing latency compared to communicating through, first a PC or smartphone, second an access point, and third to the XBOX CLOUD GAMING account. Similarly, a headset or other accessory device may connect directly to the XBOX CLOUD GAMING account and be associated with the same session through a direct connection through the access point. A cloud-direct data channel personality may use TCP/IP (Level 1 through 7 of the OSI stack) to communicate state data or receive audio or haptic information.

When this personality is enabled, the accessory device may initially gather access point and credential information securely from a control channel or through manual input into the accessory device directly. The accessory device will then attempt to pair with the access point host device and XBOX CLOUD GAMING to securely attest itself and begin communication. To assist the user, when the Cloud-Direct personality is loaded, previously-stored SSID and access point credentials will be accessed from non-volatile storage on the accessory device and used. This allows the user to re-connect without needing the initial control device setup or manual input.

In some embodiments, a user views which data channel personality is active on the accessory device via the control application or control device. For example, a smartphone connected to the accessory device via a control channel may display the control application, which indicates which data channel personality is active on the accessory device. In some embodiments, the accessory device includes one or more status indicators to indicate to the user which data channel personality is active on the accessory device. For example, the accessory device may include a plurality of status lights on the accessory device that are associated with different data channel personalities. It should be understood that the status indicator may be located proximate any surface of the body of the accessory device, including the front surface, top surface, back surface, etc.

In some embodiments, the status indicator is located proximate to a surface of the body of the accessory device to allow a user to view the status of the data channel personality without a separate device or screen. In some examples, the status indicator is located on a surface of the body of the accessory device, such as affixed to the surface of the body. In some examples, the status indicator is located in a surface of the body of the accessory device, such as lights embedded in the surface of the body.

The illuminated status light may indicate the active data channel personality of the accessory device. In some embodiments, the status light may illuminate with the associated data channel personality is selected and change color when a data channel is established with the host device. In at least one embodiment, the status light may illuminate a first color, change to a second color upon establishing a data connection with an access point, and change a third color upon establishing a connection with a user's account on a cloud-based service through the access point. In at least another embodiment, the status light may flash when a data channel personality is selected and turn solidly illuminated upon establishing a data connection with a host device. The status light may then change color upon establishing a connection with a user's account on a cloud-based service through the access point.

In some embodiments, the control device and/or control application manages the data channel personality selection and/or management. The control device and/or control application may allow the creation of a first data channel personality, such as creating a game console data channel using 802.11n protocol. The details associated with the game console data channel using 802.11n protocol may be stored locally on the accessory device. The control device and/or control application may allow the creation of a second data channel personality, such as creating a cloud-direct data channel personality that includes SSID information, access point credentials, and cloud-based service credentials to access a cloud-based service via a cloud service data channel through a second host device (e.g., access point). In some embodiments, the second data channel personality may be the same protocol as the first data channel connection, such as pairing information to a different game console using the 802.11n protocol. The accessory device can then precisely switch between data channels with different host devices with a similar communication protocol.

The control device and/or control application may adjust the total number of available data channel personalities. In another example, a first cloud-direct data channel personality may allow the accessory device to retain and reuse login credentials for a first cloud-based service and a second cloud-direct data channel personality may allow the accessory device to retain and reuse login credentials for a second cloud-based service. In other examples, a first cloud-direct data channel personality may allow the accessory device to retain and reuse first SSID and access point credential with login credentials to connect to a cloud-based service and a second cloud-direct data channel personality may allow the accessory device to retain and reuse second SSID and access point credentials with login credentials for the cloud-based service. The accessory device may then select different access points or frequencies of an access point to connect to the cloud-based service.

The control device and/or control application may enable device pairing by providing a display and/or input mechanisms by which network or pairing information may be entered to the accessory device over the control channel. For example, some devices require a code to be entered to confirm a pairing of devices over Bluetooth. In other examples, the SSID may be selected on a display of the control device, and a network passcode entered on a keyboard, to provide the accessory device with the network information for a data channel to an access point.

In some embodiments, the control device and/or control application includes a list of data channel personalities. The desired data channel personality may be selected from the list or through another selection mechanism to instruct the accessory device, via the control channel, to change the radio firmware, vendor radio firmware, and control firmware in system memory of the accessory device. In at least one example, user account information is stored on the control device and/or control application to provide greater security for the user's account. In the event that a game controller is lost, the game controller alone would not be able to connect to the user's cloud-based service account without the control device and/or control application, also.

In some embodiments, the accessory device allows data channel personality selection, cycling, or management by one or more manual inputs into buttons, switches, triggers, sticks, touch sensitive surfaces, or directional pads. For example, a sliding switch with four positions may select (and indicate) the active data channel personality on the accessory device. For example, a first position may select a first data channel personality (802.11n), a second position may select a second data channel personality (802.11ax), a third position may select a third data channel personality (Bluetooth data channel), and a fourth position may select a fourth data channel personality (Cloud-direct via access point).

In other embodiments, the manual input is to a personality button on a face of the accessory device, where the personality button cycles through stored data channel personalities, such as those created by the control device and/or control application. As described herein, a status light or plurality of status lights may indicate the active data channel personality. In at least one example, a display screen of the accessory device may display the active data channel personality.

In the example of a game controller, the manual input may include one or more of the digital input buttons located on the game controller that are conventionally used for game inputs. For example, depressing the personality button alone may cycle through stored data channel personalities, while depressing the personality button in combination with the "X" button may select the 802.11ax game console data channel personality. Different button combinations may select different data channel personalities. In at least one embodiment, the personality button only changes the active data channel personality when depressed in combination with at least one other input button. For example, a system button (e.g., the "Xbox button" or "PlayStation button" in the MICROSOFT XBOX ELITE SERIES 2 CONTROLLER or the SONY DUALSENSE CONTROLLER, respectively) may call up a top menu or operating system main screen when depressed alone, and the system button may function as a personality button when depressed in combination with another input button.

In some embodiments, the accessory device selects the data channel personality automatically without explicit user input. In some embodiments, the control device and/or control application automatically sends instructions to the accessory device to select a data channel personality automatically without explicit user input. The data channel personality may be automatically selected based on the information stored in or associated with the data channel personalities of the accessory device. In some embodiments, the accessory device may store, in non-volatile memory, the last-used data channel personality and reload the last-used data channel personality.

In some embodiments, a method of communicating between an accessory device and a host device includes obtaining a plurality of data channel personalities, wherein each of the data channel personalities includes a unique radio communication and network protocol for the wireless communication device of the accessory device. The plurality of data channel personalities may be obtained from the hardware storage device of the accessory device or provided to the system memory of the accessory device by a control device via a control channel.

The method further includes selecting a data channel personality from the plurality of data channel personalities and loading the firmware into system memory associated with the selected data channel personality. The accessory device can then transmit data to a host device using the wireless communication device of the accessory device according to the selected data channel personality. As described herein, the data channel personality may be selected through manual inputs on the accessory device or through selections made by user inputs to the control device or control application.

In some embodiments, a data channel personality may be automatically selected based on a recognized RF signal in the presence of the accessory device. The accessory device and/or control device may detect the presence of a known host device through advertising on the appropriate frequency. In the event only one known host device is present or detected, the accessory device may select that the associated data channel personality to establish the data channel with that host device. For example, a user may use a game controller at their home with a game console with a first data channel personality and at another location to play cloud-based games with a second data channel personality. When a presence of the game console is detected by the accessory device and/or control device, the accessory device may select the first data channel personality, and when a presence of the known SSID stored in the cloud-direct data channel personality is detected, the accessory device may select the second data channel personality.

In some embodiments, the plurality of data channel personalities has a priority list of the data channel personalities. When the presence of more than one data channel personality is detected, the accessory device may select the first data channel personality, for example, when the accessory device is in proximity to a known game console, the accessory device may prioritize connection with the game console. An example of this would be when the user uses the game controller at their home with their home console and connects to an access point at a friend's house to play cloud-based games. In the event that the user brings their console to their friend's house, the game controller would detect both the game console and access point as potential host devices. The game controller would prioritize the data channel personality associated with the game console.

The data channel personality may be automatically selected based on a calculated proximity to a recognized RF signal when a plurality of recognized RF signals is present. The accessory device and/or the control device may determine a proximity to a host device based on the strength of an RF signal therebetween. For example, the accessory device may determine a distance to a known host device by establishing a wireless data connection with the host device and measuring a distance to the host device based on a round trip time or other distance measurement method. The accessory device and/or control device may automatically select a data channel personality based on the host device that is physically closest to the accessory device, inferring that the user intends to use the accessory device with host device closest to the accessory device. While host devices are in communication range with the accessory device, this method may be useful in automatically selecting the appropriate data channel personality between an 802.11ax data channel personality to connect to a game console in the user's living room and a BLE data channel personality to connect to a PC in the user's home office.

The data channel personality may be automatically selected based on the location of the accessory device and/or the control device. For example, the accessory device and/or control device may determine a physical location of the accessory device based on an IP address or a GPS location. In some embodiments, a first physical location of the accessory device may be associated with a cloud-direct data channel personality, and a second physical location of the accessory device is associated with a Wi-Fi-based game console data channel personality.

In some embodiments, the accessory device and/or control device (or control application) may use a combination of techniques described herein to automatically select a data channel personality. For example, the accessory device may have, stored thereon, a data channel personality associated with a BLE data channel with the user's smartphone (which may or may not be the control device). The user will commonly have their smartphone on their person or nearby, such that the smartphone is frequently the physically closest potential host device to the accessory device irrespective of where the user is using the accessory device. In such an example, the accessory device may automatically select a data channel personality based on proximity, presence, location, or other method except for automatically selecting the smartphone.

In at least one embodiment, the accessory device and/or the control device (or control application) automatically selects the data channel personality to be used based on one or more logic or machine learning (ML) models. For example, the accessory device and/or the control device (or control application) may record usage information for a data channel personality or for the accessory device, such as the identity of a user using the accessory device, the location of the accessory device and/or the control device during use, the duration of use, the time of day, day of the week, etc. The usage information may be provided to the one or more ML models and/or compared to an existing ML model to better predict the appropriate data channel personality to be selected. For example, the usage information may indicate that the user exclusively plays cloud-based games after 10:00 pm. In another example, the usage information may indicate that the user has never used the accessory device in the current physical location, and the accessory device or control device may select the cloud-direct data channel personality to load the appropriate radio firmware in anticipation of connecting to an access point for cloud-based services.

A ML model, according to the present disclosure, refers to a computer algorithm or model (e.g., a classification model, a regression model, a language model, an object detection model) that can be tuned (e.g., trained) based on training input to approximate unknown functions. For example, a machine learning model may refer to a neural network or other machine learning algorithm or architecture that learns and approximates complex functions and generate outputs based on a plurality of inputs provided to the machine learning model. In some implementations, a machine learning system, model, or neural network described herein is an artificial neural network. In some implementations, a machine learning system, model, or neural network described herein is a convolutional neural network. In some implementations, a machine learning system, model, or neural network described herein is a recurrent neural network. In at least one implementation, a machine learning system, model, or neural network described herein is a Bayes classifier. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs. In at least one embodiment, the ML model is a supervised or semi-supervised model that is trained using a plurality of known user behaviors and/or known accessory device usage information.

In some embodiments, a status indicator, such as described herein, visually communicates to a user the data channel personality that is active, pending, available, or recently failed between the accessory device and a host device. In some embodiments, a status bar has a plurality of status lights on an accessory device. In some embodiments, the status lights are each a symbol indicating a different communication protocol of the accessory device. In some embodiments, the status bar includes a configurable screen that displays one or more symbols associated with an active, pending, available, or recently failed data channel personality. In at least one embodiment, the configurable screen displays a plurality of symbols associated with available endpoint connections and touching or otherwise interacting with the configurable screen selects a data channel personality associated with the symbol depicted thereon.

As described herein, in some embodiments, a status indicator such as the status bar is located proximate to a surface of the body of the accessory device to allow a user to view the status of the data channel personality without a separate device or screen. In some examples, the status bar is located on a surface of the body of the accessory device, such as affixed to the surface of the body. In some examples, the status bar is located in a surface of the body of the accessory device, such as lights embedded in the surface of the body. It should be understood that the status indicator or status bar may be located proximate any surface of the body of the accessory device, including the front surface, top surface, back surface, etc.

In some embodiments, the first status light includes a symbol representing a game console communication protocol configured to communicate with a game console, such as 802.11n, 802.11ax, or another wireless communication protocol with a game console such as described herein. In at least one example, the game console communication protocol is a proprietary communication protocol such as XBOX DIRECT. In some examples, the game console communication protocol uses 2.4 GHz RF transmissions, 5.0 GHz RF transmissions, or other frequency or frequency ranges of RF transmissions. At least one data channel personality using the game console communication protocol may be stored on the hardware storage device of the accessory device to allow the accessory device to establish an endpoint connection with a previously paired game console.

In some embodiments, the second status light includes a symbol representing a BLUETOOTH communication protocol configured to communicate with another host device, such as a laptop computer, a desktop computer, a smartphone, a tablet computer, a hybrid tablet-laptop computer, a television or other display device, or another electronic device. In some embodiments, the BLUETOOTH communication protocol is or includes BLUETOOTH LOW ENERGY (BLE) communications. At least one data channel personality using the BLUETOOTH communication protocol may be stored on the hardware storage device of the accessory device to allow the accessory device to establish an endpoint connection with a previously paired host device.

In some embodiments, the third status light includes a symbol representing a Cloud-Direct communication protocol, such as described herein. The Cloud-Direct communication protocol allows the accessory device to communicate with a cloud service via an access point to a network. At least one data channel personality (including access point credentials and/or cloud service credentials) using the Cloud-Direct communication protocol may be stored on the hardware storage device of the accessory device to allow the accessory device to establish an endpoint connection with a previously paired access point and/or cloud service.

With stored data channel personalities (and, optionally, credentials as needed), the accessory device can switch between the communication protocols associated with the first status light, the second status light, and the third status light and communicate the active communication protocol and/or endpoint connection intuitively to a user via the symbols.

In some embodiments, the status bar further includes a personality button configured to change the selected endpoint connection. For example, the personality button may transmit a data channel personality change request to a processor of the accessory device. The data channel personality request then causes the processor to increment through or select from a list of stored data channel personalities stored on the hardware storage device of the accessory device.

In some embodiments, a method of selecting an endpoint connection from an accessory device, includes receiving an endpoint connection change request or data channel personality change request from a personality button of an accessory device. In some embodiments, depressing the personality button transmits the endpoint connection change request or data channel personality change request from the personality button to a processor of the accessory device. In some embodiments, double-pressing the personality button (e.g., pressing twice without a predetermined time period) transmits the endpoint connection change request or data channel personality change request to limit and/or prevent intended endpoint connection change requests or data channel personality change requests.

In some embodiments, the method includes requesting a data channel connection between a communication device of the accessory device and a selected endpoint connection. In some embodiments, the accessory device is in data communication with a control device via a control channel, such as via BLE, and remains in data communication with the control device via the control channel while the data channel changes in response to the endpoint connection change request or data channel personality change request from the personality button. In some embodiments, requesting a data channel connection between a communication device of the accessory device and a selected endpoint connection includes the processor accessing and transmitting stored credentials via the communication device.

In some embodiments, requesting a data channel connection between a communication device of the accessory device and a selected endpoint connection includes changing communication protocols and/or changing a transceiver of the communication device, such as changing from a game console data channel personality using a 2.4 GHz RF connection to a Cloud-Direct data channel personality using a 5.0 GHz Wi-Fi 6 connection to an access point to communicate with a cloud service. In some embodiments, requesting a data channel connection between a communication device of the accessory device and a selected endpoint connection includes using the same communication protocols and/or transceiver of the communication device but changing endpoint connection, such as changing from communicating with a first host device via a BLUETOOTH connection with stored pairing information to communicating with a second host device via a BLUETOOTH connection with stored pairing information.

The method further includes establishing a data channel between the communication device of the accessory device and the selected endpoint connection. Establishing a data channel may include receiving a response from the host device of the endpoint connection. In response to establishing the data channel, the method includes indicating the selected endpoint connection via a status indicator of the accessory device. As described herein, indicating the selected endpoint connection via a status indicator may include illuminating a status light. The status light may be or include a symbol corresponding to the communication protocol and/or endpoint connection of the data channel.

In some embodiments, the status indicator includes an audio indicator for endpoint connection. For example, the status indicator outputs an audio signal to an audio output device. The audio output device may then play an audible sound to the user to indicate that an endpoint connection has been selected, an endpoint connection has been established, an error has occurred in endpoint connection, or other status of the endpoint connection.

In some embodiments, the status indicator includes a haptic indicator for endpoint connection. For example, the status indicator includes a haptic indicator that uses a linear haptic device (such as a VCA), an ERM, other haptic device, or combinations thereof. The status indicator outputs a haptic signal to the haptic device(s), which, in turn, produce a haptic output through the accessory device to the user to indicate that an endpoint connection has been selected, an endpoint connection has been established, an error has occurred in endpoint connection, or other status of the endpoint connection.

In some embodiments, the status bar includes a plurality of status lights that include symbols corresponding to different communication protocols. In some embodiments, the status light selectively illuminate and/or dim to communicate a status of the communication protocols and/or endpoint connections associated therewith. In some embodiments, the first status light (e.g., a game console symbol) is dimmed and a second status light (e.g., a BLUETOOTH symbol) is dimmed, while a third status light is illuminated, such as indicating an active Cloud-Direct data channel and/or endpoint connection.

Upon interacting with the personality button, such as by depressing, double-pressing, touching, etc., the accessory device changes data channel personalities as described herein and begins establishing a new endpoint connection according to the data channel personality. While the accessory device attempts to establish the data channel with the new endpoint connection, the pending endpoint connection is indicated to the user by the flashing first status light and the dimmed third status light. The flashing first status light indicates that the accessory device is attempting to establish a data channel with a host device or endpoint connection associated with a game console data channel personality. Conversely, the dimmed third status light indicates that the accessory device no longer has an active data channel in communication with the cloud service associated with a Cloud-Direct data channel personality. In some embodiments, a continuously illuminated first status light indicates a successfully established data channel with the endpoint connection associated with the game console data channel personality.

In some embodiments, an accessory device has a plurality of stored endpoint connections or stored data channel personalities associated with a communication protocol. In some embodiments, a status bar has a second status light that includes secondary status lights that indicate different endpoint connections and/or different data channels associated with the communication protocol. In some embodiments, a first input to the personality button, such as depressing the personality button, transmits a request to change communication protocol, while a second input to the personality button, such as double-pressing the personality button, transmits a request to change endpoint connections of the communication protocol. For example, a double-press to the personality button may change endpoint connections of the BLUETOOTH communication protocol, and the first secondary status light is illuminated to indicate that a first endpoint connection of the BLUETOOTH communication protocol is active. The second secondary status light and the third secondary status light are dimmed.

Because the visual status indicators may be illuminated to indicate active endpoint connections, the light from the status indicator may be distracting or confusing to a user while using the accessory device. In some embodiments, the status indicator and/or the personality button (or other input mechanism for requesting a data channel personality change) may be selectively enabled to limit and/or prevent distractions or unintended data channel personality changes.

In some embodiments, an accessory device has a motion sensor in data communication with a processor. The processor is further in data communication with a status bar, such as embodiments of the status bar described herein. In some embodiments, the motion sensor includes a gyroscope, an accelerometer, or other sensors configured to measure a movement and/or orientation of the accessory device. For example, the motion sensor may transmit motion information to the processor, which based at least partially on the motion information, selectively enables or disables the status bar (which includes status indicators and/or a personality button). In some embodiments, the motion information may be transmitted directly to the status bar to selectively enable or disable at least part of the status bar. While the embodiment of the accessory device described above includes a status bar, it should be understood that a motion sensor may provide motion information to a processor to selectively enable or disable other status indicators (such as haptic or audio status indicators) and/or other input mechanisms for data channel personality changes.

During conventional use of the accessory device (e.g., during navigation of system menus and/or during interaction with an interactive software application (e.g., game application)), a user holds the accessory device with the front face of the accessory device facing the user and the top edge oriented away or perpendicularly to the user. As the status bar is oriented away from the user during conventional usage, the status bar (including status indicators and/or a personality button) may be selectively deactivated when the motion sensor indicates the accessory device is being held in a conventional flat orientation. When the user rotates the accessory device to orient the top edge upward toward the user (e.g., when the top edge is oriented within 45° of straight upward), the motion sensor transmits motion information to the processor of the accessory device to enable and/or illuminate at least part of the status bar.

In some embodiments, the processor selectively enables one or more status indicators in response to the motion information. For example, when the motion information indicates the status bar is oriented upward, the third status light associated with the active selected endpoint connection is illuminated. In some examples, additional haptic or audio status indicators are enabled. In some embodiments, the processor of the accessory device selectively enables one or more input mechanisms, such as a personality button, in response to the motion information. For example, when the motion information indicates the status bar is oriented upward, the personality button is enabled to allow the user to input a data channel personality change request via the personality button.

Conversely, when the motion information indicates the status bar is not oriented upward (e.g., the accessory device has returned to the flat orientation), the processor may selective disable at least a portion of the status bar. For example, the status lights may dim to reduce distractions for the user during use of the accessory device (such as in a dark room) and/or the personality button may be disabled to limit and/or prevent unintentional inputs during usage.

In other embodiments, at least part of the status bar, the status indicator(s), input mechanisms for changing data channel personalities, and combinations thereof are selectively enabled or disabled according to other conditions or criteria. In some examples, the at least part of the status bar, the status indicator(s), input mechanisms for changing data channel personalities, and combinations thereof are active for a predetermined time period after the accessory device is powered on. For example, the status bar may be active for the first 10 seconds after turning the accessory device on, providing the user with an opportunity to view the active endpoint connection and, if desired, input a data channel personality change request via the personality button. In some embodiments, the time period resets upon inputting a data channel personality change request via the personality button. In some embodiments, the time period resets upon establishing an endpoint connection.

In some embodiments, a system includes an accessory device in data communication with a host device via a data channel and in data communication with a control device via a data channel. In some embodiments, the accessory device selectively enables or disables at least part of the status bar, the status indicator(s), input mechanisms for changing data channel personalities, and combinations thereof based at least partially on transmissions from the host device. For example, the user may desire to input a data channel personality change request only when in system menus or a top menu of the host device operating system, and the user may desire to limit and/or prevent an input of a data channel personality change request during interaction with an interactive software application. In a specific example, the user may desire to limit and/or prevent an input of a data channel personality change request on a game controller during gameplay of a game application executed on the host device. In some embodiments, the host device transmits a host status signal to the accessory device that informs the accessory device of a status of the host device, and, based at least partially on the host status signal, the accessory device selectively enables or disables at least part of the status bar, the status indicator(s), input mechanisms for changing data channel personalities, and combinations thereof.

In some embodiments, upon failure of the data channel with the host device, either during establishment of the data channel or failure of the data channel after establishment, the accessory device transmits a message to the control device providing additional information regarding the failure. For example, when the accessory device receives a data channel personality change request and attempts to establish a new channel according to the selected data channel personality, if the accessory device is unable to establish the new data channel, the accessory device indicates to the user, via a status indicator, the failure and transmit, via the control channel, additional failure information and/or troubleshooting information to the control device for the user to review.

In at least some embodiments of the present disclosure, an electronic device includes status indicators and/or input mechanisms to allow native selection and intuitive awareness of different communication protocols with different endpoint connections. In some embodiments, the accessory device selectively enables or disables at least part of the status bar, the status indicator(s), input mechanisms for changing data channel personalities, and combinations thereof to reduce distractions and limit and/or prevent unintended switching of endpoint connections.

The present disclosure relates to systems and methods for changing endpoint connections of an accessory device without a screen according to at least the examples provided in the sections below:

[A1] In some embodiments, a device includes a controller body, at least one user input device supported by the controller body, a communication device, and a status indicator. The communication device communicates at least one property of the at least one user input device to a selected endpoint connection. The status indicator is located proximate a surface of the body, and the status indicator dynamically indicates the selected endpoint connection of the communication device, where the selected endpoint connection is selected from a plurality of endpoint connections including at least a local electronic device and an access point configured to communicate with a cloud service.

[A2] In some embodiments, the device of [A1] includes a personality button configured to change the selected endpoint connection.

[A3] In some embodiments, the personality button of [A2] is configured to provide a data channel personality change request via a first input to the personality button and a device change request via a second input to the personality button.

[A4] In some embodiments, the plurality of endpoint connections of any of [A1] through [A3] includes endpoint connections via a plurality of communication protocols.

[A5] In some embodiments, at least one of the communication protocols of [A4] is 802.11ax.

[A6] In some embodiments, at least one of the communication protocols of [A4] is Bluetooth.

[A7] In some embodiments, the status indicator of any of [A1] through [A6] includes a plurality of symbols associated with different communication protocols, and a symbol of the plurality of symbols is selectively indicated when an associated communication protocol is active for a data channel.

[A8] In some embodiments, the status indicator of [A7] includes secondary status lights configured to indicate an active device endpoint connection of a plurality of stored device endpoint connections for a communication protocol.

[A9] In some embodiments, the status indicator of any of [A1] through [A8] includes a configurable screen.

[A10] In some embodiments, the status indicator of any of [A1] through [A9] includes a haptic device.

[A11] In some embodiments, the haptic device of [A10] generates a first haptic signal in response to a connection with a first endpoint connection and a second haptic signal in response to a connection with a second endpoint connection, wherein the first haptic signal and second haptic signal are different.

[A12] In some embodiments, the device of any of [A1] through [A11] includes a motion sensor in data communication with the status indicator, and at least part of the status indicator is configured to illuminate in response to motion information from the motion sensor.

[B1] In some embodiments, a method of presenting device information to a user includes receiving a data channel personality change request from a personality button of a game controller; requesting a data channel connection between a communication device of the game controller and a selected endpoint connection from a plurality of endpoint connections, wherein the plurality of endpoint connections have at least three different communication protocols, establishing a data channel between the communication device of the game controller and the selected endpoint connection; and in response to establishing the data channel, indicating the selected endpoint connection via a symbol representative of the selected endpoint connection on a status indicator of the game controller.

[B2] In some embodiments, the personality button of [B1] changes state to indicate the selected endpoint connection of the game controller.

[B3] In some embodiments, the method of [B1] or [B2] further includes receiving motion information from a motion sensor and receiving a data channel personality change request from a personality button of a game controller includes receiving the endpoint connection change request based at least partially on receiving the motion information.

[B4] In some embodiments, the method of any of [B1] through [B3] includes, in response to a failure of establishing the data channel, indicating the failure to establish a data channel via the status indicator.

[B5] In some embodiments, the method of [B4] includes transmitting a failure message to a control device via a control channel between the game controller and the control device.

[B6] In some embodiments, the method of any of [B1] through [B5] includes receiving host device status information from a host device of the endpoint connection; and disabling the personality button based at least partially on the host device status information.

[C1] In some embodiments, a method of presenting device information to a user includes receiving motion information from a motion sensor of an accessory device; based at least partially on the motion information, enabling a personality button of the accessory device; receiving a data channel personality change request from the personality button of the accessory device; requesting a data channel connection between a communication device of the accessory device and a selected endpoint connection from a plurality of endpoint connections, wherein the plurality of endpoint connections have at least three different communication protocols; establishing a data channel between the communication device of the accessory device and the selected endpoint connection; and in response to establishing the data channel, indicating the selected endpoint connection via a symbol representative of the selected endpoint connection on a status indicator of the accessory device.

[C2] In some embodiments, the method of [C1] further includes receiving additional motion information from the motion sensor and disabling the personality button based at least partially on the additional motion information.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A device comprising:
a controller body;
at least one user input device supported by the controller body;
a communication device configured to communicate at least one property of the at least one user input device to a selected endpoint connection; and
a status indicator located proximate a surface of the body, wherein the status indicator dynamically indicates the selected endpoint connection of the communication device from a plurality of endpoint connections, wherein the selected endpoint connection is selected from the plurality of endpoint connections including at least a local electronic device and an access point configured to communicate with a cloud service.

2. The device of claim 1, further comprising a personality button configured to change the selected endpoint connection.

3. The device of claim 2, wherein the personality button is configured to provide a data channel personality change request via a first input to the personality button and a device change request via a second input to the personality button.

4. The device of claim 1, wherein the plurality of endpoint connections includes endpoint connections via a plurality of communication protocols.

5. The device of claim 4, wherein at least one of the communication protocols is 802.11ax.

6. The device of claim 4, wherein at least one of the communication protocols is Bluetooth.

7. The device of claim 1, wherein the status indicator includes a plurality of symbols associated with different communication protocols, wherein a symbol of the plurality of symbols is selectively indicated when an associated communication protocol is active for a data channel.

8. The device of claim 7, wherein the status indicator includes secondary status lights configured to indicate an active device endpoint connection of a plurality of stored device endpoint connections for a communication protocol.

9. The device of claim 1, wherein the status indicator includes a configurable screen.

10. The device of claim 1, wherein the status indicator includes a haptic device.

11. The device of claim 10, wherein the haptic device generates a first haptic signal in response to a connection with a first endpoint connection and a second haptic signal in response to a connection with a second endpoint connection, wherein the first haptic signal and second haptic signal are different.

12. The device of claim 1, further comprising a motion sensor in data communication with the status indicator, and at least part of the status indicator is configured to illuminate in response to motion information from the motion sensor.

13. A method of presenting device information to a user, the method comprising:
receiving a data channel personality change request from a personality button of a game controller;
requesting a data channel connection between a communication device of the game controller and a selected endpoint connection from a plurality of endpoint connections, wherein the plurality of endpoint connections have at least three different communication protocols;
establishing a data channel between the communication device of the game controller and the selected endpoint connection; and
in response to establishing the data channel, indicating the selected endpoint connection via a symbol representative of the selected endpoint connection on a status indicator of the game controller.

14. The method of claim 13, wherein the personality button changes state to indicate the selected endpoint connection of the game controller.

15. The method of claim 13, further comprising receiving motion information from a motion sensor and wherein receiving a data channel personality change request from a personality button of a game controller includes receiving the endpoint connection change request based at least partially on receiving the motion information.

16. The method of claim 13, further comprising:
in response to a failure of establishing the data channel, indicating the failure to establish a data channel via the status indicator.

17. The method of claim 16, further comprising:
transmitting a failure message to a control device via a control channel between the game controller and the control device.

18. The method of claim 13, further comprising receiving host device status information from a host device of the endpoint connection; and
disabling the personality button based at least partially on the host device status information.

19. A method of presenting device information to a user, the method comprising:
receiving motion information from a motion sensor of an accessory device;
based at least partially on the motion information, enabling a personality button of the accessory device;
receiving a data channel personality change request from the personality button of the accessory device;
requesting a data channel connection between a communication device of the accessory device and a selected endpoint connection from a plurality of endpoint connections, wherein the plurality of endpoint connections have at least three different communication protocols;
establishing a data channel between the communication device of the accessory device and the selected endpoint connection; and
in response to establishing the data channel, indicating the selected endpoint connection via a symbol representative of the selected endpoint connection on a status indicator of the accessory device.

20. The method of claim 19, further comprising receiving additional motion information from the motion sensor, and disabling the personality button based at least partially on the additional motion information.

* * * * *